(12) United States Patent
Kong et al.

(10) Patent No.: US 9,505,554 B1
(45) Date of Patent: Nov. 29, 2016

(54) CAPTURING PACKAGING IMAGE VIA SCANNER

(71) Applicant: Amazon Technologies, Inc., Reno, NV (US)

(72) Inventors: Cheuk-Man Kong, Toronto (CA); Mohan Krishna Rao, Mississauga (CA); Morley Duncan Abbott, Toronto (CA); Balasubramaneyam Maniymaran, Scarborough (CA)

(73) Assignee: Amazon Technologies, Inc., Reno, NV (US)

( * ) Notice: Subject to any disclaimer, the term of this patent is extended or adjusted under 35 U.S.C. 154(b) by 148 days.

(21) Appl. No.: 14/035,671

(22) Filed: Sep. 24, 2013

(51) Int. Cl.
G06F 7/00 (2006.01)
B65G 1/00 (2006.01)
H04N 5/232 (2006.01)

(52) U.S. Cl.
CPC ............ B65G 1/00 (2013.01); H04N 5/23212 (2013.01)

(58) Field of Classification Search
None
See application file for complete search history.

(56) References Cited

U.S. PATENT DOCUMENTS

| | | |
|---|---|---|
| 5,963,134 A | 10/1999 | Bowers et al. |
| 5,970,471 A | 10/1999 | Hill |
| 6,154,771 A | 11/2000 | Rangan et al. |
| 6,273,338 B1 | 8/2001 | White |
| 6,541,100 B1 | 4/2003 | Williams et al. |
| 6,566,024 B1 | 5/2003 | Bourdelais et al. |
| 6,969,092 B2 | 11/2005 | Macwilliams et al. |
| 2002/0194051 A1 | 12/2002 | Hall et al. |
| 2003/0004816 A1 | 1/2003 | Byers, Jr. et al. |
| 2003/0009392 A1 | 1/2003 | Perkowski |
| 2010/0121482 A1* | 5/2010 | Jackson ............... G06Q 10/087 700/217 |
| 2011/0035045 A1* | 2/2011 | Walter ................. B65G 1/1373 700/214 |
| 2013/0253700 A1* | 9/2013 | Carson et al. ......... G07F 9/006 700/236 |

OTHER PUBLICATIONS

"Book Collector Book Inventory Software," Collectorz.com Book Collector, n.d., <http://www.collectorz.com/book/book_inventory.php?from=google&keyword=book$_{13}$ inv ... > [retrieved Dec. 31, 2003]. pp. 1-2.
"Book Collector Features," Collectorz.com Book Collector, n.d., <http://www.collectorz.com/book/features.php> [retrieved Dec. 31, 2003]. pp. 1-2.
"Edge, Junction, and Corner Detection Using Color Distributions," ACM Portal, ACM, Inc. © 2004, <http://portal.acm.org/citation.cfm?=505477&dl=ACM&coll=portal> [retrieved Feb. 24, 2004]. pp. 1-7.

(Continued)

Primary Examiner — Yolanda Cumbess
(74) Attorney, Agent, or Firm — Robert C. Kowert; Meyertons, Hood, Kivlin, Kowert & Goetzel, P.C.

(57) ABSTRACT

Methods of and devices and systems for obtaining and using images of items as the items appear in an inventory area (e.g., storage bin) are disclosed. Images of inventory areas are captured before and after stow or pick operations. A difference between the before and after images is determined and extracted as an image of the item that was stowed or picked. The process may be repeated for numerous units of the item and one or more definitive item images are selected. The definitive item image may be displayed to pickers directly to facilitate picking, or may be used to determine the position of a unit of the item in a particular inventory area such that the position of the item to be picked may be indicated to the picker. Definitive item images may also be used for inventory validation, enforcement of pick and stow etiquette.

20 Claims, 14 Drawing Sheets

(56) References Cited

OTHER PUBLICATIONS

"Technology and Services," Advanced Records Management Services, Inc., n.d., <http://www.armsrecords.com/pg4.html> [retrieved Dec. 31, 2003]. pp. 1-3.

"Visual Inventory Control Software," Dynamic Control Software, n.d. <http://www.dynamiccontrolsoftware.com> [retrieved Dec. 31, 2003]. pp. 1-3.

Feder, A., "A Look at Delicious Library 3.0 (images)," Think Secret, Aug. 3, 2004, <http://thinksecret.com/news/deliciouslibrary.html> [retrieved Jan. 19, 2005]. pp. 1-4.

"A look at Delicious Library 3.0 Overview," Think Secret, Aug. 3, 2004, <http://thinksecret.com/archives/images/deliciouslibrary/overview.html> [retrieved Jan. 19, 2005]. p. 1.

"Visual Inventory Control," Dynamic Control Software, <http://dynamiccontrolsoftware.com>, publicly available prior to Jun. 9, 2004, [retrieved Jan. 19, 2005]. pp. 1-2.

U.S. Appl. No. 10/864,291, filed Jun. 9, 2004, Lawrence Tesler et al.

U.S. Appl. No. 13/875,769, filed May 2, 2013, Lawrence Tesler et al.

\* cited by examiner

CAPTURING PACKAGING IMAGE VIA SCANNER

BACKGROUND

Retailers, wholesalers, and other product distributors (which may collectively be referred to as distributors) typically maintain an inventory of various items that may be ordered by clients or customers. Similarly, manufacturers may maintain an inventory of parts and/or materials for use in manufacturing processes. This inventory may be maintained and processed at a materials handling facility which may include, but is not limited to, one or more of: warehouses, distribution centers, cross-docking facilities, order fulfillment facilities, packaging facilities, shipping facilities, or other facilities or combinations of facilities for performing one or more functions of material (inventory) handling.

When a customer places an order, one or several inventory items specified in the order must be retrieved or "picked" from inventory and prepared for delivery to the customer. Traditionally, like items are stored together within inventory to facilitate inventory tracking and management. For example, items having a common Universal Product Code (UPC), Stock-Keeping Unit (SKU) code, or other designation (including proprietary designations) may be stored together within inventory. In an inventory environment that includes a large number of many different items, it may be highly inefficient for a single employee to physically locate and pick every item for a given order. For example, different items specified in a given order may be stored at mutually remote locations within the inventory facility, which would require a single picking agent to traverse a long path through the facility.

In order to make better use of inventory stocking space, it may be desirable to stock different items together in a single storage location or stocking area. While increasing the efficient use of inventory space, such co-location of different items may increase the difficulty, and thus the time, of identifying and picking a particular item. When picking items from inventory, the picking agent may generally need to examine some number of co-located items in order to determine the specific item to pick. This can be time consuming in situations where numerous similar items are stored together. Additionally, several similarly titled or described items may be stored in a single inventory area, increasing the difficulty of identifying any particular item. For instance, if several CDs are entitled "Greatest Hits" and stored together, a picking agent may have to read the full title for each item in turn to identify the correct item. The extra time this requires may be significant when multiplied across the large number of orders fulfilled by a typical facility. Similarly, in a facility handling items for rent or sale, there may be a large number of similar-looking items, such as DVDs, stored together. A picking agent may have difficulty identifying particular DVDs from among multiple DVDs in a single inventory. Again, any extra time required to correctly identify a DVD becomes significant, since each DVD may be stored and picked many times, as it is rented and returned.

Furthermore, items may be stored in packaging, such as shipping boxes, made of cardboard for example, that may not readily indicate what is contained in the packaging to a picking agent. For example, various large televisions may each be stored in packaging specifically designed to protect the television (and the television's retail product packaging as well) from damage while in transit and while being stored. This protective packaging may be comprised of plain cardboard packaging and the like that does not readily indicate the particular model, color, size or other identifying information that would be helpful to a picker in distinguishing the item from other televisions stored in the same area. While some protective packaging may indicate the manufacturer for example, the picker and facility may rely upon bar codes and the like which may require time-consuming scanning to particularly identify which of the many particular items of the manufacturer is contained within the shipping box. In other instances, product packaging for similar items may not readily identify the differences between the similar items, leading to confusion and mistakes during picking. While a picker may have an idea of what the item to be picked looks like, the plain packaging of shipping boxes and the like may prevent perception of the item by the picker because the picker is not familiar with the shipment packaging or because shipping packaging tends to look similar across multiple items, for example.

Some materials handling facilities include a pick-to-light system, in which lights mounted on shelves or racks in inventory are programmed to light up to indicate a bin or other storage area in which items having a given product identifier are stored. Such systems may include support for put-to-light operations, as well (e.g., lighting up a container in which items should be stored). However, such systems may not be suitable for use in facilities that store different items together in a single inventory area, or in facilities in which agents traverse multiple inventory areas during picking and stowing operations, or in facilities in which mobile drive units bring storage bins of inventory to the picker/stower at a station. Also, such technologies only identify a location or bin, not individual items.

Figure 1:
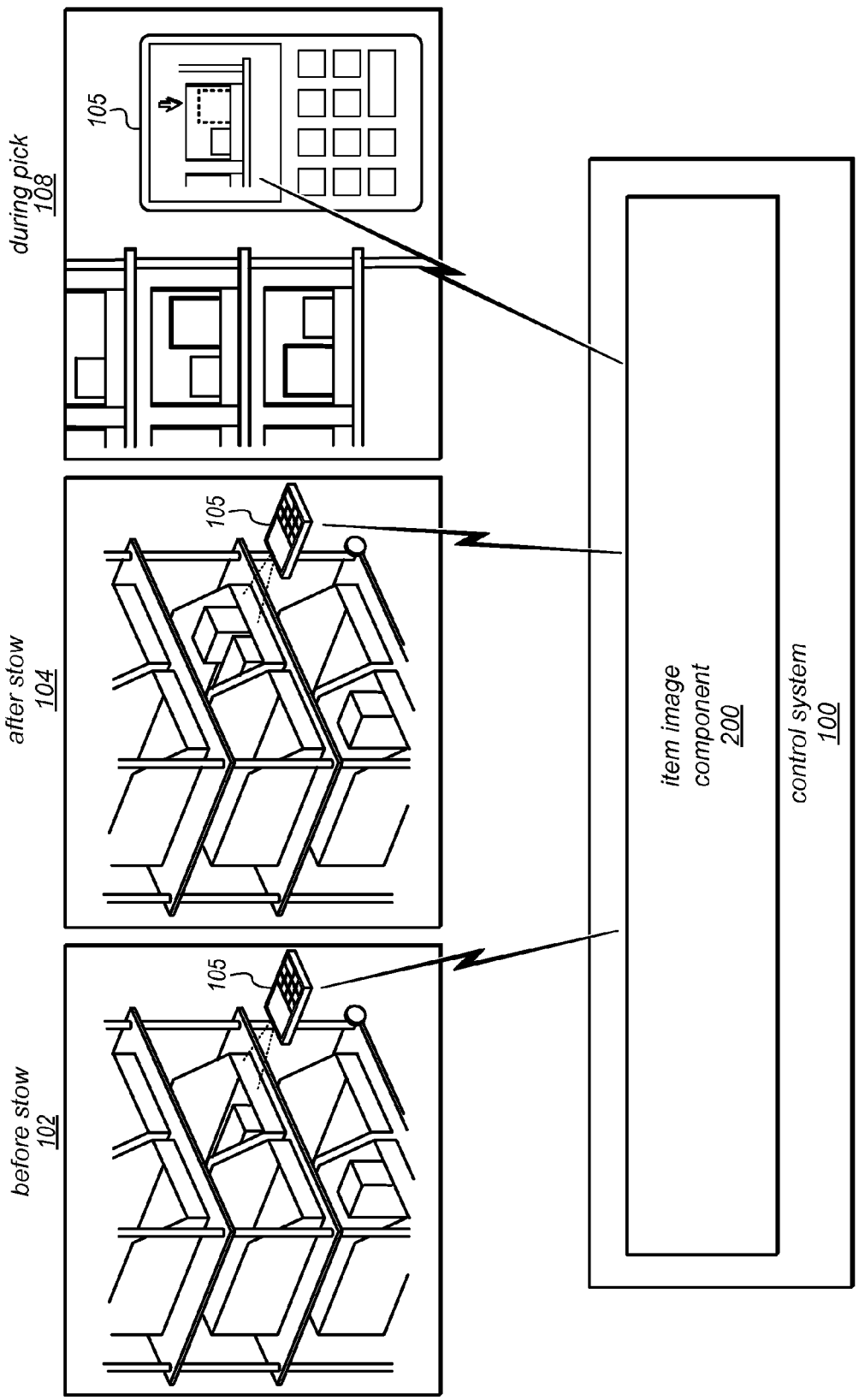
FIG. 1 illustrates an implementation of a process to capture an image of an item, as the item appears in inventory, and subsequently display an image of the item as the item appears in inventory, when picking a unit of the item, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

In a materials handling facility, multiple, different product items may be stored together in a single inventory area, such as a shelf, rack, bin, or drawer. For example, a facility may store items such as books, CDs, DVDs, electronic devices, clothing, toys, hardware, materials, and/or other items together in various combinations within each inventory area. Items may be stored in inventory areas by an agent, either randomly, pseudo-randomly or according to one or more guidelines, with an inventory area selected for each item automatically, such as by software executing on a control system, in some embodiments. An agent or control system may record the selected inventory area for each item in a product database, which may include a description, inventory location number, or other data representing the inventory area in which the item is to be stored, along with position and/or descriptive information for the item (e.g., such as an image of the item), indexed by a product identification code, for example.

An image-based capture/display system may be used to facilitate operations in such a materials handling facility, including, but not limited to, stowing and picking operations. For example, an image-based capture/display device may be configured to capture images of items as the items appear at respective storage locations and send the images to a control system that is also part of the image-based capture/display system. An image-based capture/display device may request the images from or the images may be sent from the control system to the image-based capture/display device for display, for example, to an agent attempting to pick the item. An image-based capture/display system may comprise various components in various arrangements. In one example, the image-based capture/display system may a comprise a control system and any number of variously configured devices used to capture images, display images or display other information about items. In another example, an image-based capture/display system may include more or fewer components such as an image-based capture/display device or a scanner and separate display device. Various other arrangements and combinations of the various components described herein are also contemplated.

A picking agent may be provided instructions to locate and obtain a particular item from an inventory area. The instructions may include the stored location, position, and/or descriptive information for the item, and may be usable by the picking agent to locate and identify the item to be obtained, or "picked." In different embodiments, the term "agent" may refer to a human person working in the materials handling facility or to an automated piece of equipment configured to perform the operations of an agent, as described herein. For example, in some embodiments, a robotic device may perform the role of a stowing agent or a picking agent.

A picking agent may be provided with an image of the item or the retail packaging of the image to facilitate the pick. The image may be the image of the item from a product page of the item, for example. However, the item itself or the retail packaging of the item may be hidden when the item is stored in the inventory area, for example, by shipping packaging. Therefore, in some embodiments, it may be useful to provide the picker with an image of the shipping packaging of the item in order. In some embodiments, displaying such an image to a picker may facilitate more expedient picking and/or to reduce the cognitive load placed on a picker trying to find the item in the inventory area. Furthermore, it may be useful to provide the picker with an image of the item as the item appears in the inventory area.

Images of items in the inventory area may be gathered during and used to facilitate operations in a materials handling facility, including, but not limited to, stowing and picking operations. An image or images of the item as the item appears in the inventory area may be obtained in several different ways. For example, images of items may be obtained as part of receiving the item at the materials handling facility or as part of an item imaging process at receiving. However, obtaining an item image at receiving may add additional time to the process of receiving items and may not fully capture what the item looks like in the inventory area.

Another method of obtaining an image of the item is to capture an image of the item while the item is in the inventory area. For example, agents may be tasked or directed to capture images of items in the inventory area as part of an item image obtainment process that obtains images of items outside of the other processing of the materials handling facility. In another example, image capturing may be performed as part of the already existing, day-to-day activities of the materials handling facility. For example, images of items may automatically be captured as part of the stowing and/or picking process. Some material handling facilities operate to stow items to inventory by a particular method. One such method in particular involves an agent navigating to an area of the inventory area where space is available to stow an item. The agent may then scan an identifier (ID) of the item, scan an ID of the particular inventory area or storage location (e.g., a storage bin or shelf, an indicated area of the floor, a pallet or the like), place the item in the particular inventory area and then scan the ID of the particular inventory area again. Scan may mean that a device captures an identifier, and any particular scan may also include sending the identifier to the control system. An image of the item in the particular storage area may be captured during this process. For example, an image of the inventory may be captured concurrent with the overall stowing process, or more specifically, as part of scanning the ID of the particular inventory area before and after the item has been placed in the particular inventory area. Alternatively, or additionally, an image of the item may be obtained in a similar fashion during the pick process. As described in various embodiments disclosed herein, the image of the item in the inventory area may be captured by a device used to scan the ID of the item and inventory area or by an image capture device separate from the device used to scan the ID of the item, for example, a fixed camera at an inventory station that mobile inventory locations are delivered to.

Images of items in storage bins may be captured before and after a picking or stowing process. For example, a diff process may be used to determine the difference between the before and after images. In some embodiments, the difference between the before and after images should be an image of the item as it appears in the storage location and may be extracted and saved as an image of the item. The process may involve extracting numerous images of numerous units of the item from numerous pick and/or stow operations across numerous storage locations. This process of gathering images of items as they appear in inventory may be performed repeatedly to capture multiple images of the item (e.g., from different angles, in various packaging, etc.) to allow for variances in how the item is packaged or how the item appears or how the item is placed in an inventory area. One or more representative images may be selected for the item using any of various techniques (e.g. image-quality based or machine learning techniques, etc.). The representative images may be used to support numerous processes within a materials handling facility, for example during picking or to perform an image-based inventory analysis, etc.

The image of the item may include the entire storage bin or some portion of the storage bin in addition to the item. Various markers on the storage bin or other inventory areas may be captured in the images. The markers may support such functionality as determining the size of the item in the image or the orientation of the storage bin or camera used to capture the image. For example, the markers themselves may be of a known size or may graphically indicate physical, real-world dimension information such that only one marker need be captured in an image to be used to determine dimension data of an item in the image. In other embodiments, a distance between two or more markers may be known such that when two markers are captured in an image, the known physical, real-world distance between the two can be used to determine the physical, real-world size of items also in the image. The image of the item may include additional units of various items that appear next to or otherwise nearby the item in the inventory area (e.g., storage bin). Various methods may help to distinguish the item from the other items in the storage bin. For example, images of the inventory area before and after either of the stowing or picking process may be compared. The difference between the before and after image may be an image of the item that was stowed or picked. This process of gathering images of items as they appear in inventory may be repeated to gather numerous images of the item such that one or more exemplary images may be selected as representative of the item in the inventory area. Selection of the one or more exemplary images may include analyzing the collected images. For example, an analysis of the collected images for an item may determine whether all of the images are actually images of units of the same item. Another example of the analysis may include determining whether the packaging of an item is similar across all units, or that some units are stored in different containers that have a different appearance from other units of an item of the same type Other characteristics for which image analysis may be performed include the image size, image quality or representativeness of the image of the unit for the group.

Representativeness may be a measure of how well the image of one particular unit of the item serves as a representation for other units of the item. In some embodiments, more than one image of the item may be selected as representative images of the item. For example, some shipping containers are six sided cardboard boxes. The boxes may be stowed randomly among other items and may also be stowed in various orientations (e.g., askew, upside-down, on their side). As such, in one embodiment, six images of the item, one for each side of the box, may each be associated with item. In some embodiments, when an item image is used to determine what type of item a unit is or the position of the item in storage area, each of the six images may be used to try to match the unknown item with images of known items. Such analysis may include analysis of an images color, size, textual content, shape and the like. In some embodiments, images of the items and the storage bins may be used to keep an image-based inventory, as described herein.

Once a representative image or images of the item has/have been selected, they may be used to support multiple forms of functionality. For example, the representative image of the item may be supplied to an agent that is attempting to pick the item. Some estimates have placed the amount of time a picker stands scanning a storage bin for an item at anywhere from about 5-20 seconds, depending upon various circumstances. A picker may be slowed down by any number of characteristics of the picker, the inventory area or items. For example, a picker may be not know whether a particular book has a thin or thick spine, or a book with a thin spine may be difficult to discern from other books in the inventory area. In another example, the picker may be unaware that versions of an item exist or may be unfamiliar with how the packaging indicates the differences between versions of the item. Providing the picker with an image of the item as the item appears in inventory may reduce the amount of time the picker spends looking for the item in the inventory area.

Etiquette

Accordingly, item image comparison may be used to enforce picking and stowing etiquette, for example, and may trigger an additional inventory verification of the particular inventory area. Additional inventory verification may include further inspection of the image or other images of the same inventory area or a physical visit to the inventory area, for example by an agent.

In addition or as an alternative to still images, video may also be used to implement the methods disclosed herein. For example, video technology may be used to capture the image of the item in the inventory area. Some devices may operate with a video capability that is always on or that may be configured to capture video at certain times, for example, when an item or a storage bin is being scanned. In some embodiments, devices with video capability, such as always on video capability may continuously save video images (e.g., to a shallow video buffer). Some event (e.g., a scan or other event during a pick or a stow) may trigger the content of the buffer to be saved and images from the saved content may be used in a similar fashion as the images described herein (e.g., to obtain item images as described herein).

The system described herein may in some embodiments be configured to present all of the information needed to reach a targeted inventory area (e.g., path information), to identify a given position of an item within the targeted inventory area (e.g., position information), and/or to identify a given item within the targeted inventory area (e.g., descriptive and image information) at the same time (e.g., at the beginning of a stowing or picking operation). In other embodiments, different types and/or amounts of information may be presented to an agent as the stowing or picking operation progresses. For example, only path information may be presented to an agent until he or she reaches a targeted inventory area, and then additional information may be presented, such as the image of the item and the inventory location as the agent reaches the location. In some embodiments, an image-based display system may be used in conjunction with one or more other types of communication devices (e.g., handheld communication devices, RFID tags and/or readers, scanners, and/or cameras) to carry out the various operations of the materials handling facility. For example, in some embodiments, stations that receive storage units via mobile drive units may display highlighted images of the location of items within the storage bin on a display that is separate from a scanning device used by the agent picking items from the storage bin.

The methods described herein may in various embodiments be implemented by any combination of hardware and software. For example, in one embodiment, the methods may be implemented by a computer system that includes a processor executing program instructions stored on a computer-readable storage medium coupled to the processor. The program instructions may be configured to implement the functionality described herein (e.g., the functionality of the control system, product database, laser-based display devices, and/or other communication devices).

Various processes of gathering and using images of items as the items appear in an inventory location are disclosed. FIG. 1 illustrates an implementation of one such process, which, in one embodiment, may cause a captured image of a unit of an item, as the unit appears in inventory, to be displayed to an agent that has been directed to pick the item from the inventory location. As illustrated in FIG. 1, an order fulfillment facility or other materials handling facility may include an inventory management system employing an item image capture and display system in various operations of the facility. In various embodiments, the system may include an item image component 200 and control system 100. In the illustrated example, a before image (illustrated as before stow 102) may be captured (and perhaps triggered by) when an inventory location is scanned before the unit is stowed. Then, after the unit has been stowed, the inventory location may be scanned once again and an after image (illustrated as after stow 104) may be captured concurrently (and perhaps triggered by) the scan event. Once the before and after images are captured, the two images may be processed (e.g., by an item image component 200 performing a diff process—an image-based process that determines the difference between two images). Item image component 200 may be part of, or separate from, control system 100 in various embodiments. The difference between the two images may be an image of the unit of the item that was stowed as the unit looks when it is stowed. The image of the unit that was stowed may be used to determine the position of the unit in the same bin for a subsequent pick operation. The image of the unit that was stowed may also be used to determine the position of other units of the same item in other inventory locations and the position of those other units may be highlighted in an image of the respective inventory location that is displayed to a picker attempting to pick the item. For example, the control system may send the image of the inventory location to device 105 before or during the pick such that one or more units of the item to be picked are highlighted on the display of the device 105 (illustrated as during pick 108).

Figure 2:
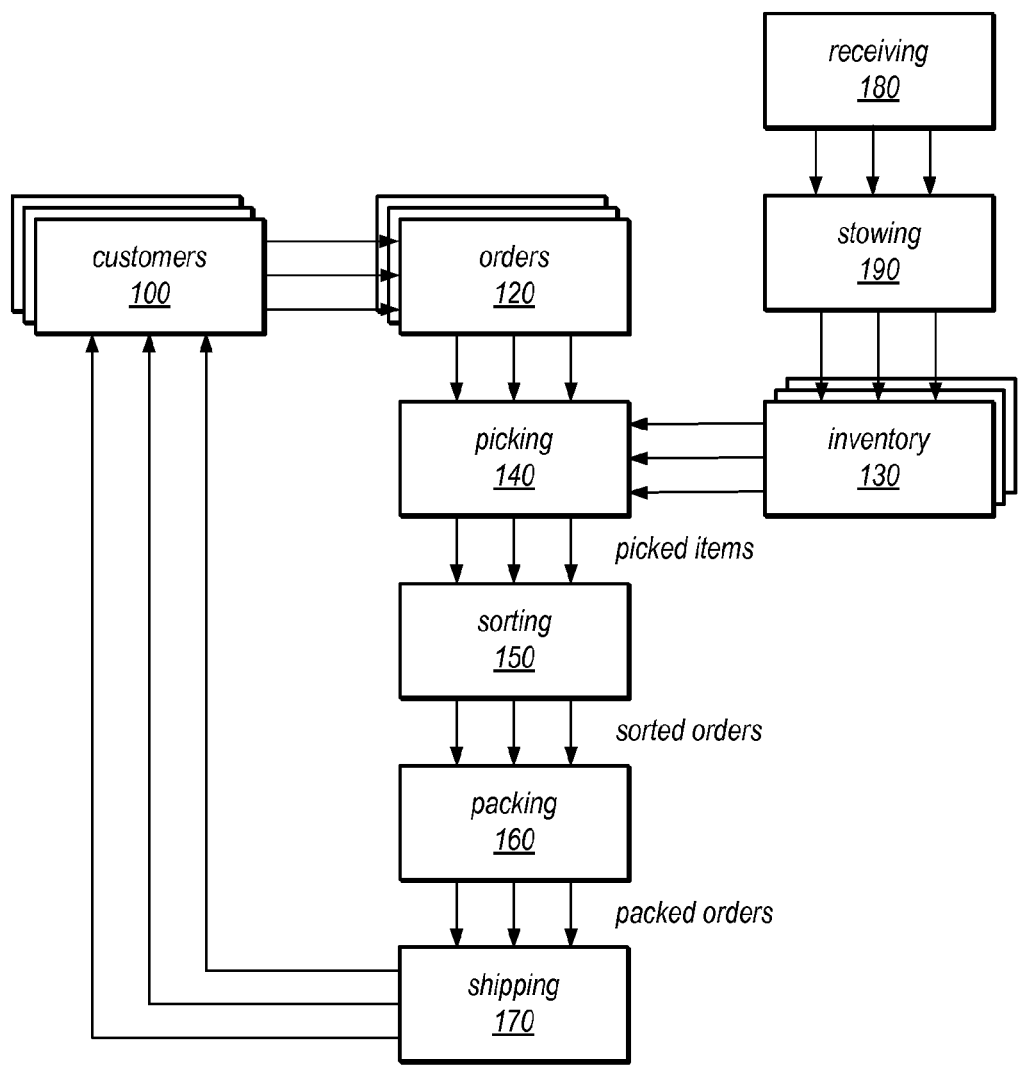
FIG. 2 illustrates a broad view of operations of a facility, which, in one embodiment, may be configured to utilize an item image capture and display system, according to some embodiments.

An order fulfillment facility or other materials handling facility may include an inventory management system employing an item image capture and display system in various operations of the facility. FIG. 2 illustrates a broad, view of the operations of one such facility, which, in one embodiment, may be configured to utilize an item image capture and display system as described herein. In this example, multiple customers 100 may submit orders 120 to the distributor of the items in the facility, where each order 120 specifies one or more items from inventory 130 to be shipped to the customer that submitted the order. To fulfill the customer orders 120, the one or more items specified in each order may be retrieved or "picked" from inventory 130 (which may also be referred to as stock storage) in the order fulfillment facility, as indicated by block 140. In some embodiments, items may be identified from inventory based on information presented to fulfillment facility personnel using an item image capture and display system, as described herein. In various embodiments, the information presented may include a description of the item to be picked, position information for the items within a given inventory area and/or images of the item to be picked as the item appears in the inventory area. Picked items may be delivered to one or more stations in the order fulfillment facility for sorting 150 into their respective orders, packing 160, and finally shipping 170 to the customers 100. Picked, packed and shipped order does not necessarily include all of the items ordered by the customer; a shipped order may include only a subset of the ordered items available to ship at one time from one inventory-storing location.

An order fulfillment facility typically also includes a receiving operation 180 for receiving shipments of stock from various vendors and a stowing operation, illustrated as stowing 190, for placing the received stock into stock storage (inventory 130). In some embodiments, stowing 190 may involve stowing an item in a location within inventory 130 selected by a control system (e.g., randomly, pseudo-randomly, or according to various guidelines for stowing similar or different items within the facility). Various embodiments may implement stow etiquette rules that define expected stow behavior when stowing an item. In some embodiments, stowing 190 may involve capturing a before and/or after image when adding items to one of the plurality of inventory areas in inventory 130. An item image capture and display system may, in some embodiments, be used to direct a stowing agent to a particular location and/or position within the inventory area and/or location in which an item is to be stowed, as described herein.

In some embodiments, an order fulfillment center may receive an order for an item not currently in the center's inventory. When the item is received, the order may then be filled and shipped. When an order is received for an item before the item has been received at an order fulfillment center, the received item may or may not be stocked into inventory before being matched up with the order and shipped out, according to various embodiments. The receipt of the item at the facility may trigger the fulfillment process for a pending order. The various operations of an order fulfillment facility may be located in one building or facility, or alternatively may be spread or subdivided across two or more buildings or facilities.

Positional item information and/or item images, as described herein in various embodiments, may be used to locate a given item to be picked from inventory 130. For example, in some embodiments, fulfillment center personnel, sometimes called agents, who retrieve ordered items from inventory 130, may be presented with position and/or descriptive information to quickly locate specific items in inventory 130 without, for example, having to read an item label, such as a book or CD title. The position and/or item images may be presented to the agents using an item image display system. For example, one or more item image display devices may be mounted within the facility and may display position information and/or item images so they are visible to the agents. Image display devices may include but are not exclusive to hand-held display devices, stationary display devices, screen-based display devices or image projection display devices, etc.

An item image capture and display system, as described herein, may be utilized in a number of different facilities and situations, including, but not limited to material handling facilities, order fulfillment centers, rental centers, distribution centers, packaging facilities, shipping facilities, libraries, museums, warehouse storage facilities, shopping centers, grocery stores, car parking lots, etc. In general, an item image capture and display system may be used in any situation in which stowage and/or picking of items is desirable.

An item image capture and display system as described herein in various embodiments, may be utilized in several areas of a materials handling or order fulfillment facility such as during receiving 180, stowing 190, picking 140, sorting 150, packing 160, and shipping 170. For example, in some embodiments an item image capture and display system may present item images and/or directions to agents who retrieve ordered items from inventory 130, so that they may quickly locate and identify specific items in inventory 130. Sorting agents, who sort items collected by picking agents, may utilize an item image capture and display system to speed the process of grouping items by order. For example, an item image capture and display system may present to the agent a list, descriptions, or images of the items that are to be grouped together.

An item image capture and display system may also aid packing agents to efficiently select an appropriately sized container for shipment, to locate the correct hopper or container being used to ship a group of items, to direct a group of items to the correct packing station, or to perform other operations, according to various embodiments. In yet another embodiment, position information and/or descriptive information may be used in a receiving station of a materials handling facility. For example, receiving personnel may be presented with instructions or images to direct them to place received items on a particular pallet or conveyor belt, or to deliver the items to a particular inventory area within the facility for unpacking and storage. For example, images of empty available inventory locations may be determined and displayed to the personnel. In some embodiments, empty available locations may be determined by the processes described herein.

The arrangement and order of operations illustrated by FIG. 2 is merely one example of many possible embodiments of the operation of an order fulfillment facility utilizing an item image capture and display system. Other types of materials handling, manufacturing, or order fulfillment facilities may include different, fewer, or additional operations and resources, according to different embodiments.

Figure 3:
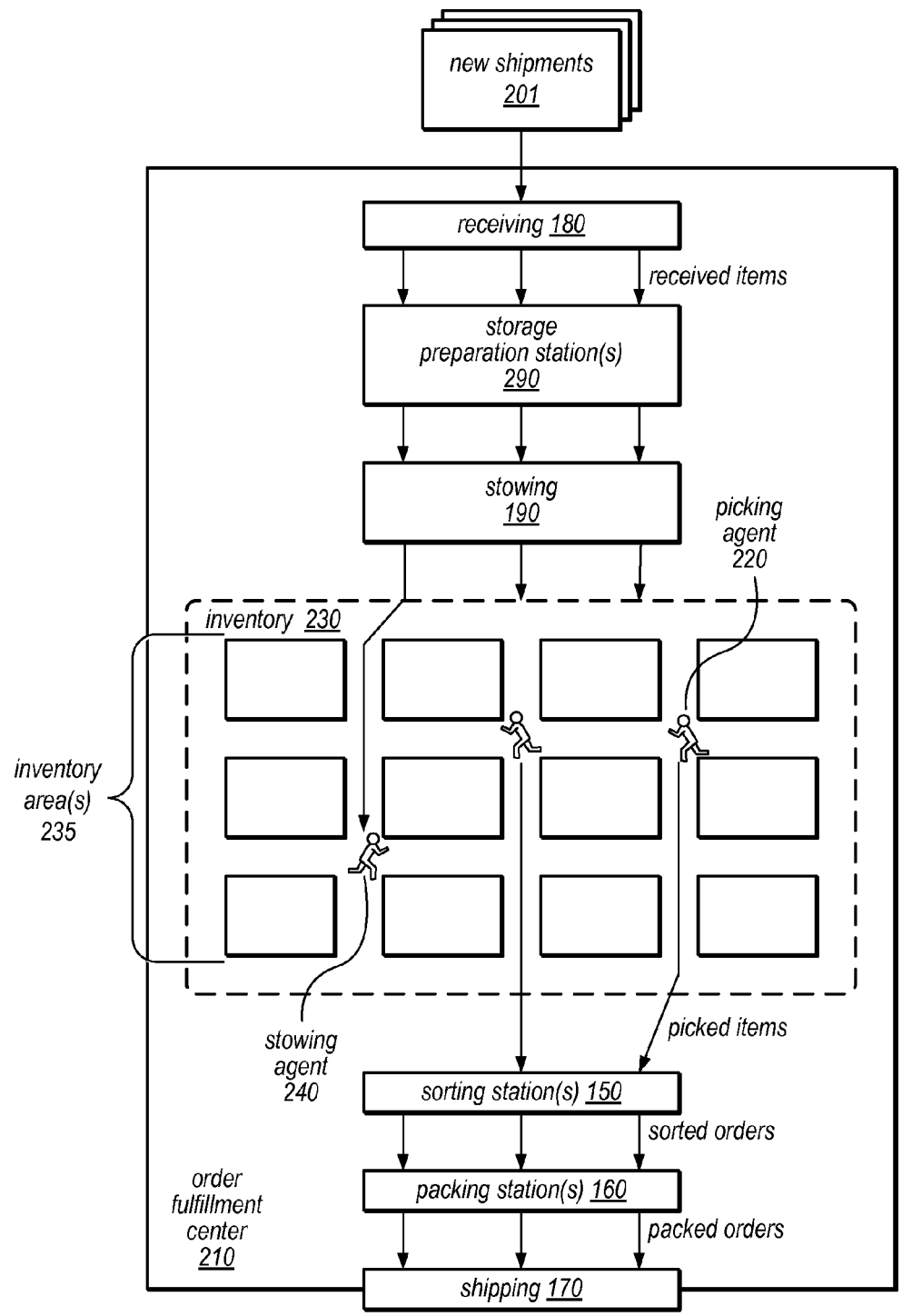
FIG. 3 illustrates a physical layout for an order fulfillment center, according to one embodiment

The stations of an order fulfillment center may be arranged in many different configurations, according to various embodiments. FIG. 3 illustrates an arrangement for an order fulfillment center 210, according to one embodiment. At any time, one or more picking agents 220 may each be picking items from inventory 230 to fulfill portions or all of one or more orders, and/or one or more stowing agents 240 may be placing items in inventory 230. According to some embodiments, an item image capture and display system may present information such as images of inventory areas with items to picking agents 220 and stowing agents 240, for example, to increase speed and efficiency when locating items from among different items that may be co-located in a single inventory area 235 and when stowing items within an inventory area 235. For example, an item image capture and display system may present a picking agent 220 with instructions to direct him or her to a particular inventory area 235, and additional information (e.g., position information, dimension information, image(s) of the item, image(s) of the item in the inventory area or other descriptive information) to assist him or her in locating one or more items from the inventory area 235. Similarly, an item image capture and display system may present instructions to a stowing agent 240 to direct him or her to a particular inventory area 235, and may present additional information (e.g., text or image information) to assist him or her in locating the specific position within the inventory area 235 in which an item is to be placed.

After obtaining items from inventory 230, picking agents 220 may transfer those items to sorting stations 150, according to one embodiment. Not every fulfillment facility includes both sorting and packing stations. In certain embodiments, agents may transfer picked items directly to a packing station, such as packing station 160, and the picked items may be directed to a particular packing station by control system 100. In other embodiments, agents may transfer picked items to a combination sorting and packing station (not illustrated). This may result in a stream and/or batches of picked items for multiple incomplete or complete orders being delivered to a sorting station 150 for sorting into their respective orders for packing 160 and shipping 170, according to one embodiment illustrated by FIG. 3. Portions of an order may be received at different times, so sorting 150 and packing 160 may have to wait for one or more items for some orders to be delivered to the sorting station(s) 150 before completion of processing of the orders. A stream or batches of incoming picked items may be sorted into their respective orders at the sorting station(s) 150. While, in some embodiments, automated sorting may be utilized, such as through the use of Crisplant® or Eurosort® sorters, in other embodiments sorting may be performed manually. In yet other embodiments, both manual and automatic sorting may be used in combination. Once an order is completed at a sorting station 150, the order may be ready to proceed to a packing station 160 to be packaged for shipping 170.

Figure 5A:
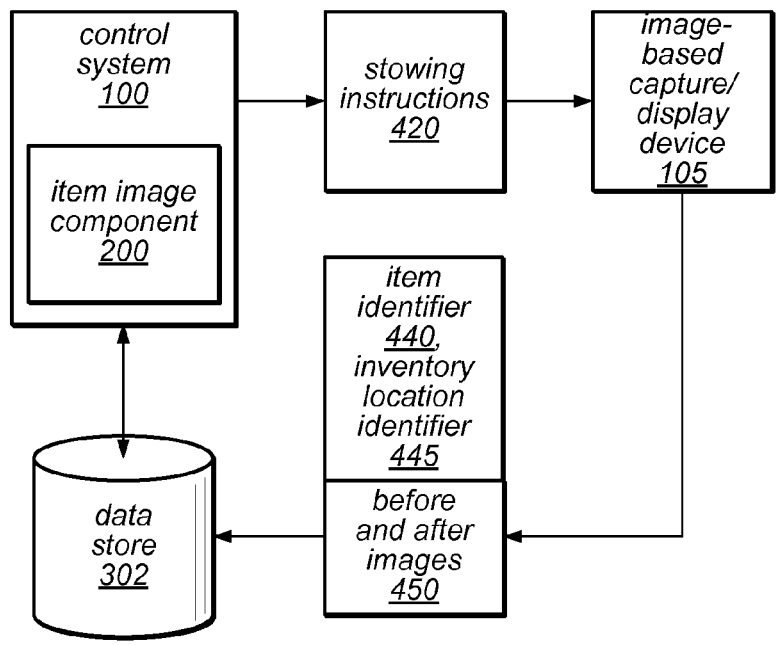
FIG. 5A illustrates an image-based capture/display device in a stowing operation, according to one embodiment.
Figure 5B:
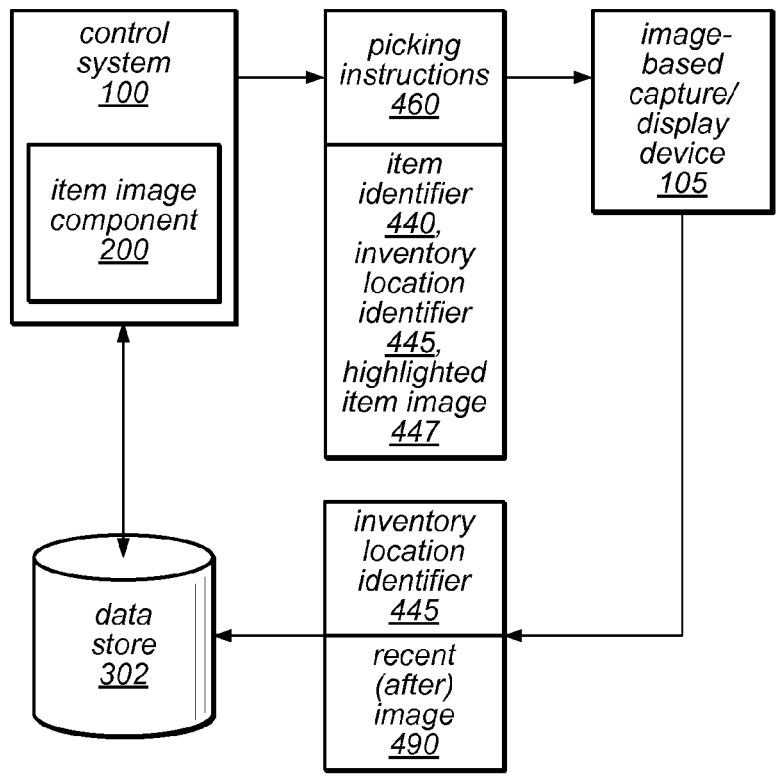
FIG. 5B illustrates an image-based capture/display device in a picking operation, according to one embodiments.

An order fulfillment facility such as an order fulfillment center 210 may implement an order fulfillment control system, or control system for short, as part of its overall inventory management system. A control system (such as illustrated in FIGS. 1, 5A and 5B and described below) may include hardware and software configured for assisting and/or directing agents in the order fulfillment center 210 in fulfilling customers' orders. For example, in some embodiments, such a control system may transmit information such as instructions and one or more item images to display devices, which may display the instructions and other information such as item images to a picking agent 220 or a stowing agent 240.

Items in inventory 230 may be marked or tagged with a bar-code, radio frequency identification (RFID) tag, Universal Product Code (UPC), Stock-Keeping Unit (SKU) code, serial number, and/or other designation (including proprietary designations) to facilitate order fulfillment center 210 operations, including, but not limited to, picking 140, sorting 150 and packing 160. These designations, or codes, may identify items by type, and/or may identify individual items within a type of item. The control system may also include, or may be used in conjunction with, handheld, mobile and/or fixed scanners or scanning devices that may be able to scan the marks or tags on individual items and/or inventory areas 235 to determine and record an identifier of an item and/or an item location. In some embodiments, a control system may be configured to access location, position and/or descriptive information for items (e.g., from a product database or other data store) and may provide this information to picking agents 220 along with other information indicating items to be obtained from inventory, as will be described in more detail below. Inventory locations may also be marked in a similar fashion.

The control system may, in some embodiments, be configured to determine the location and/or position of a picking agent 220 or a stowing agent 240 (e.g., using an indirect asset tracking device or other communication device worn or carried by the agent) and may generate stowing or picking instructions for the agent that are dependent on the agent's current location within inventory 230. For example, the control system may transmit messages including instructions for the agent to an image-based capture and/or display device 105 that is near the agent, and this image-based capture and/or display device 105 may display information suitable for directing the agent from his or her current location to the location of an item to be picked.

As described above, an order fulfillment center may include one or more receiving stations 180 for receiving shipments of stock from various vendors. The received stock may then be placed into stock storage in one or more inventory areas 235 of inventory 230 during a stowing operation (illustrated as stowing 190 in FIG. 2), in some embodiments. As described above, the control system may, in some embodiments, be configured to determine the location and/or position of a stowing agent 240 and may generate stowing instructions for the agent that are dependent on the agent's current location within inventory 230. For example, the control system may transmit messages including instructions for the agent to an image-based capture and/or display device 105 that is near the agent, and this image-based capture and/or display device 105 may display visual guidance suitable for directing the agent from his or her current location to the location in inventory in which an item is to be stowed. Once a picking agent has reached the correct inventory area, the image-based capture and/or display device 105 may display an image of the inventory location in which the item is to be stowed. For example, the image-based capture and/or display device 105 may display an image of the inventory location (e.g., bin) in which it should be placed, or any other information suitable for locating the position at which the item should be stowed.

During stowing 190, the control system may determine the locations and/or positions for stowing items in inventory areas 235 randomly, pseudo-randomly, or according to one or more positional placement guidelines, in different embodiments. When an item is stowed, an indicator of its position may be stored in a product database and associated with a product identification code or other item or product information, in some embodiments. According to certain embodiments, the position information may then be available to control system devices, communication devices, or other computer devices, as described below. For example, a control system may access the position information and may use it to generate messages that include instructions for a picking agent that are transmitted to an image-based display device and presented to the picking agent when the item is included in a customer order. Similarly, dimension information may be captured or estimated, and/or pattern-based information may be assigned or captured, for items received and stored in inventory 230 and this information may be stored in a product database and associated with a product identification code or other item or product information. This descriptive information may be accessed by the control system, transmitted to an image-based display device, and presented to a picking agent instead of, or in addition to, any position information associated with the item, in different embodiments.

As described above, many fulfillment facilities store different copies of items in different individual inventory areas within stock storage. Storing copies of items in multiple inventory areas may shorten the distance, and therefore the time, required to obtain an item from inventory, in some embodiments. Additionally, different items may be stored in a single inventory area, according to certain embodiments. Storing different items together may result in more efficient use of total inventory space than using a single inventory area for multiple copies of a single item or product. It still may be beneficial in some embodiments to store similar items together to make better use of inventory space. For example, storing different books together on a single inventory shelf may use the available inventory space more efficiently than storing one book among other items of greatly differing size and shape, such as electronic devices, clothing, toys, hardware, materials, or other items. Thus, in some embodiments, a fulfillment facility may store items of similar shape and size together in a single inventory area. For instance, in such an embodiment, items such as books, compact discs (CDs), and digital video discs (DVDs) may all be stored together. In some embodiments, multiple copies of an item may be stored together with multiple copies of other, different items. For example, a single inventory area may store multiple copies for each of several different books, CDs, or other items.

In certain embodiments, items may be randomly stored together in inventory areas. Such random storage may increase storage efficiency and may in some cases increase the likelihood that any individual item may be easily distinguished from the other items with which it is stored. Random storage of items may also decrease the amount of time needed to store individual items into inventory. A control system for the facility may track where each item is stowed. As previously described, in some embodiments, determining where to store an item may be performed manually, while in other embodiments, it may be an automated process performed by one or more computer software programs based on pattern information associated with the individual items, and/or based upon positional placement guidelines, as described below.

When obtaining a particular item from an inventory area storing different items, picking agents may have to carefully examine each item in the inventory area to properly identify the specific item to be picked. For example, if a picking agent is instructed to obtain a single copy of a book, CD, or DVD that is stored among other different books, CDs, or DVDs, the agent may have to read the title of each item in turn to identify the specific one to pick. For example, it may take a picking agent additional time to distinguish from among multiple, different CDs all of whose titles include "Greatest Hits."

In some embodiments, an image-based capture and display device may be used to display position information corresponding to the relative position of the item to be picked, or images of the actual item as it appears in the inventory area, so that the agent may not have to carefully read the title of each CD in the inventory area until the correct one is encountered.

Various aspects of an image-based system may be incorporated or rely upon position-based item identification. As such, a materials handling facility may in some embodiments operate using one or more sets of positional placement guidelines governing how items are stored in inventory areas. In various embodiments, different types of items may be stored according to different guidelines (e.g., stow etiquette). For example, books may be stored on shelves according to a guideline specifying that books should always be added to the right of any other books or other items already in the inventory area. In other examples, clothes on hangers may always be added to the right of other clothes, clothes stored on shelves may always be added to the top of a stack of clothes, or CDs and DVDs may always be added to the front of a group of similar items lined up front to back on a shelf or in a bin. In other embodiments, different guidelines may be applied to different inventory areas or to different types of inventory areas. For example, items stored on narrow shelves may always be added on the right, while items stored on deep shelves or in bins may always be added to the front. In another example, if items of different sizes and shapes are stored together in an inventory area, a placement guideline may specify that items should be placed in order of size, such as with the largest item adjacent to one side of the inventory area and successively smaller items placed next to each other toward the middle or the other side. In other embodiments, more complex guidelines for stowing items may take into account a combination of size, shape, pattern information, or other criteria in determining a position in which to place an item in an inventory area. In other embodiments, when items are added to inventory areas storing many different items that are easily distinguished from each other, the items may be added without regard to any positional placement guidelines, and the position at which an item is stowed may need to be input to the control system by the stowing agent in order to be able to retrieve it using position-based item identification.

As described above, a fulfillment center configured to fulfill orders may include a plurality of receiving stations configured to receive items for storage, a plurality of inventory areas configured to store the received items, and a plurality of packing stations configured to package items selected from the inventory areas. An agent may traverse the fulfillment center, directed to the appropriate inventory areas by a display device (e.g., an image-based capture and/or display device), and may select each item from one or more of the inventory areas. The agent may use additional information presented by the display device to locate each item within an inventory area and transfer it to one of the packing stations. In some embodiments, a handheld communication device may be used to scan an identifier of a picked item to determine if it is the correct item. Similarly, during a stowing operation, an agent may be directed to a particular inventory area using a handheld communication device, and then the agent may use a handheld communication device to scan an identifier of the inventory area and/or to enter information indicating the position within the inventory area at which the item was actually stowed. For example, a handheld communication device may include a scan device for reading bar-type scan codes, such as a SKU or ISBN on an item or may be configured to communicate with a separate scan device to receive such codes and communicate them to the control system.

Figure 4:
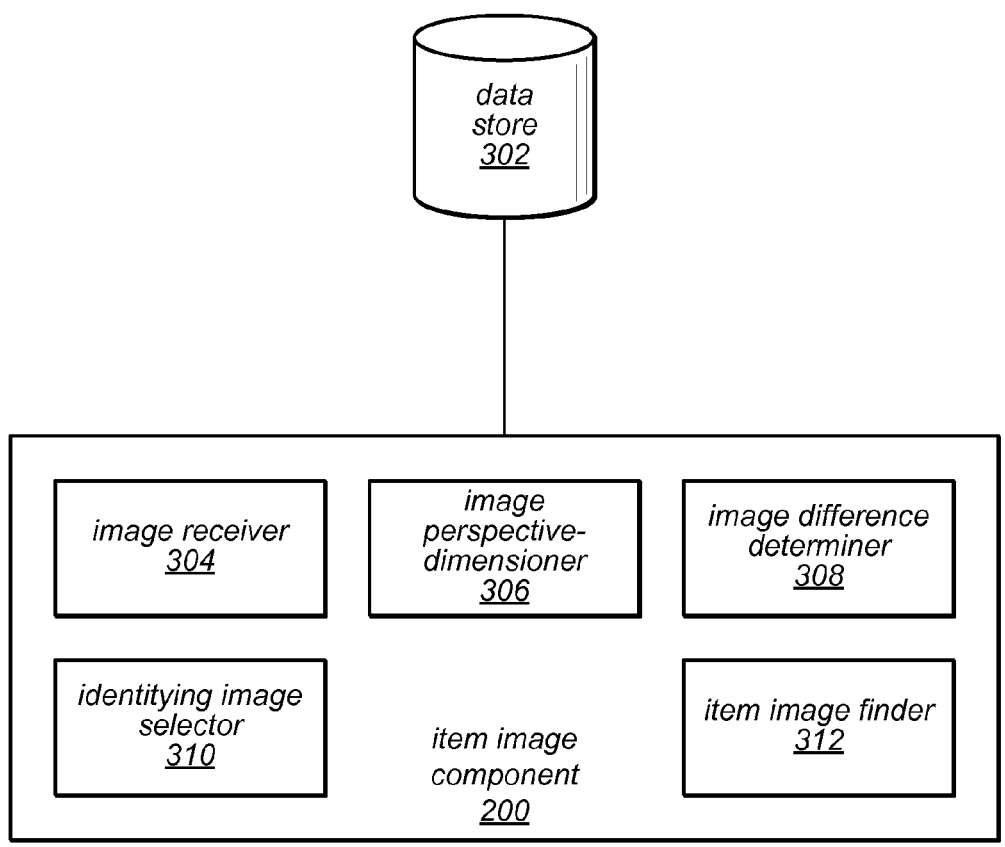
FIG. 4 illustrates an item image component and a data store, in accordance with some embodiments.

FIG. 4 illustrates an item image component 200 and a data store 302. The item image component 200 may be part of and interact with a control system 100 (as illustrated in FIG. 1) and may be coupled to a data store 302. Alternatively, part or all of item image component 200 may be separate from control system 100 and perform functions separate from control system 100. In some embodiments, data store 302 may be an enterprise data store configured to store all or most of the data of an enterprise (e.g., materials handling facility). In other embodiments, data store 302 represents a distributed collection of various independent data stores each tailored and particularly suited to the data contained therein. As illustrated in FIG. 4, data store 302 stores location information for each item and respective item images for each item of a material handling facility. Data store 302 may also include another data store, such as a product database for storing location information associated with each item handled within the facility.

The item image component 200 may be configured to store the item images for each item to data store 302 and the control system 100 may be configured to store the location information for each item to data store 302. The item images for each item may illustrate what an item looks like when the item is stowed at an inventory location. The location information for each item may indicate a location at which the item was stowed or a location at which the item is to be stowed (e.g., the location at which the control system determines it should be stored, whether or not the stowing operation has been completed). In embodiments, the item image component may be configured to send and receive images of items and inventory locations from and to data store 302 as well as various devices of the materials handling facility (e.g., image-based capture and display devices). The control system may be configured to access the stored location information for a given item when determining the targeted inventory area and when determining a path to the targeted inventory area. The item image component 200 may be configured to access item images and inventory location images and send those images to various display devices that may be used to display the images in order to facilitate various functions within the materials handling facility, such as picking items, for example. Item image component 200 may include various software modules that each provide various specialized functionality pertaining to item images. While the software modules are illustrated as part of item image component 200, alternative embodiments are contemplated wherein various of the software modules exist outside of the item image component 200.

Item images may be images of items of the materials handling facility and may be received by image receiver 304 and stored in data store 302. The images may include contextual imagery surrounding the item such as other items in the same inventory location, other inventory locations, other items in other inventory locations, etc. In some embodiments, alternative item images may be of the item itself, without other items in the image. Data store 303 may store various item images and for various reasons. Item images may be stored such that they are linked to a particular item, for example when they illustrate a visual depiction of an item in inventory. Item images may also be retained in storage such that they are linked to an inventory location, for example, when they illustrate a (e.g. recent) visual depiction of all of the items currently in the inventory location. In some embodiments, these item images may alternatively be referred to as inventory location images.

Figure 6:
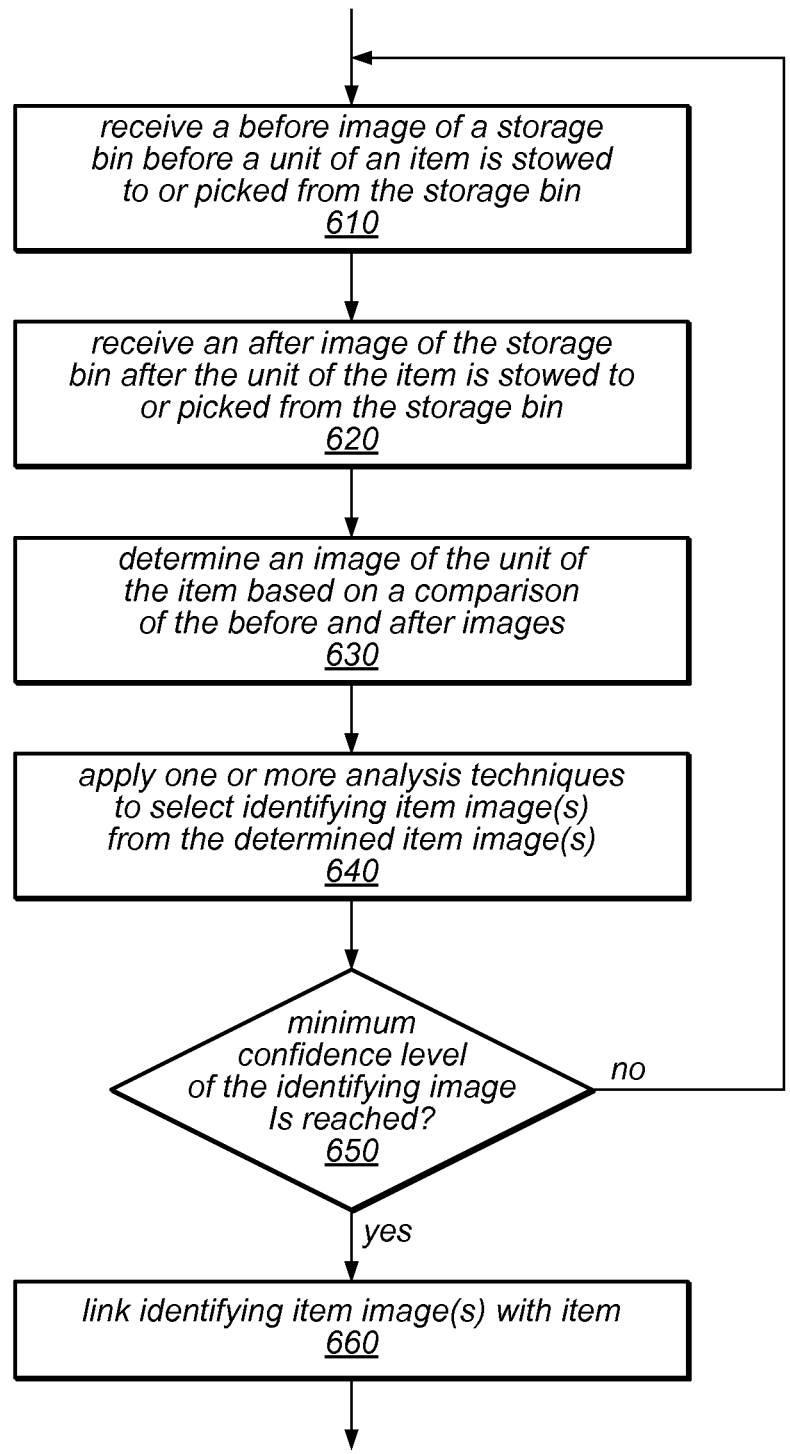
FIG. 6 illustrates a flow diagram of an identifying item image capture, determination and linking process, according to one embodiment.

Image receive 304 may be part of item image component 200. Image receiver 304 may receive images from various image capture devices of the materials handling facility. For example, an image capture device, such as a scanner with image capture capability may capture an image of an item when an inventory location associated with an item is scanned. In some embodiments, such a scan and image capture may happen when an item is stowed or when an item is picked. Image receiver 304 may receive the captured image of the item from the image capture device and send the image of the item to data store 302, for example. Some of the functionality associated with image receiver 304 is illustrated in FIG. 6, described below.

Figure 9:
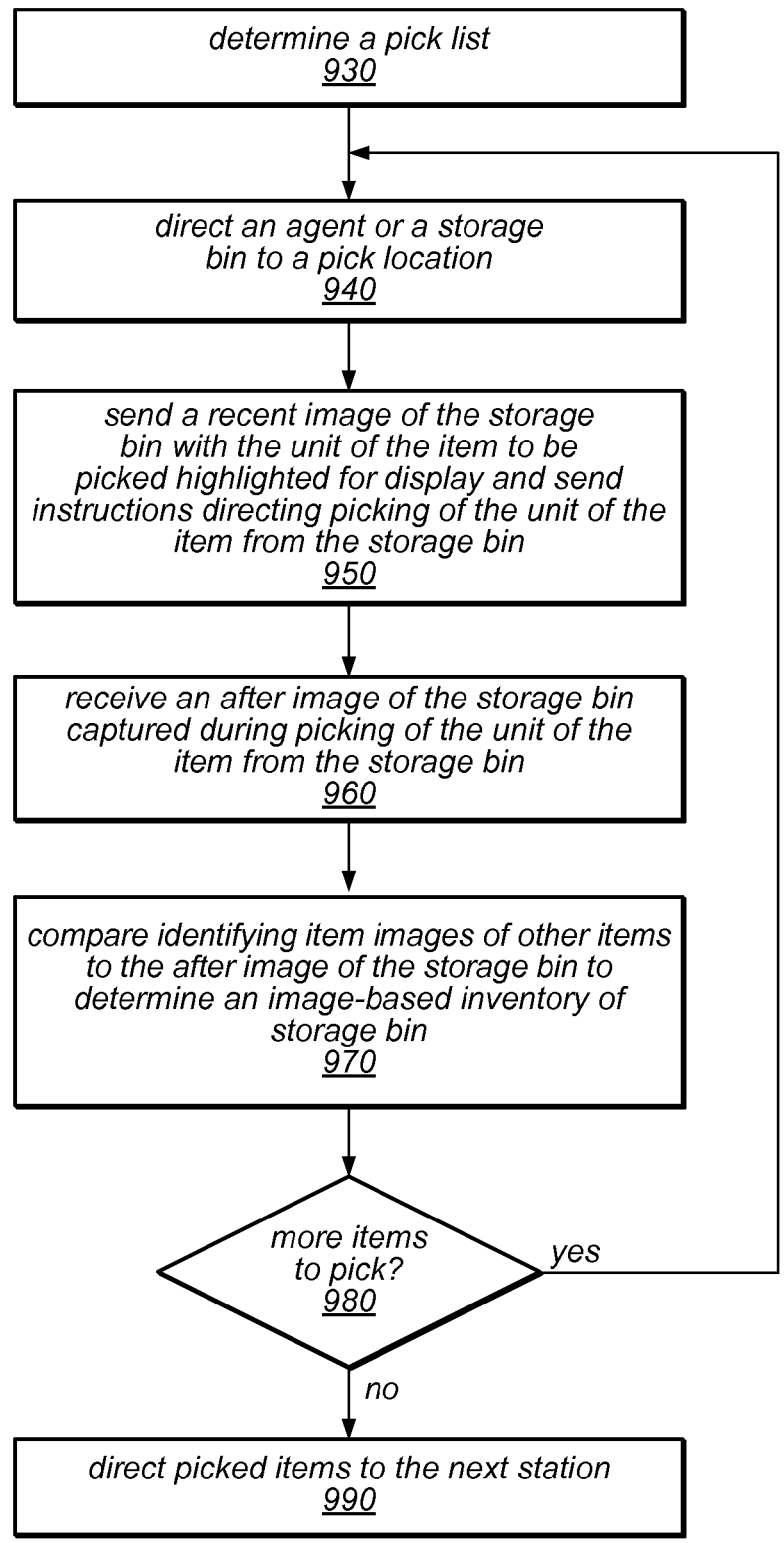
FIG. 9 is a flow chart illustrating a process of using identifying item images to direct picking of items in an inventory location, according to some embodiments.
Figure 13:
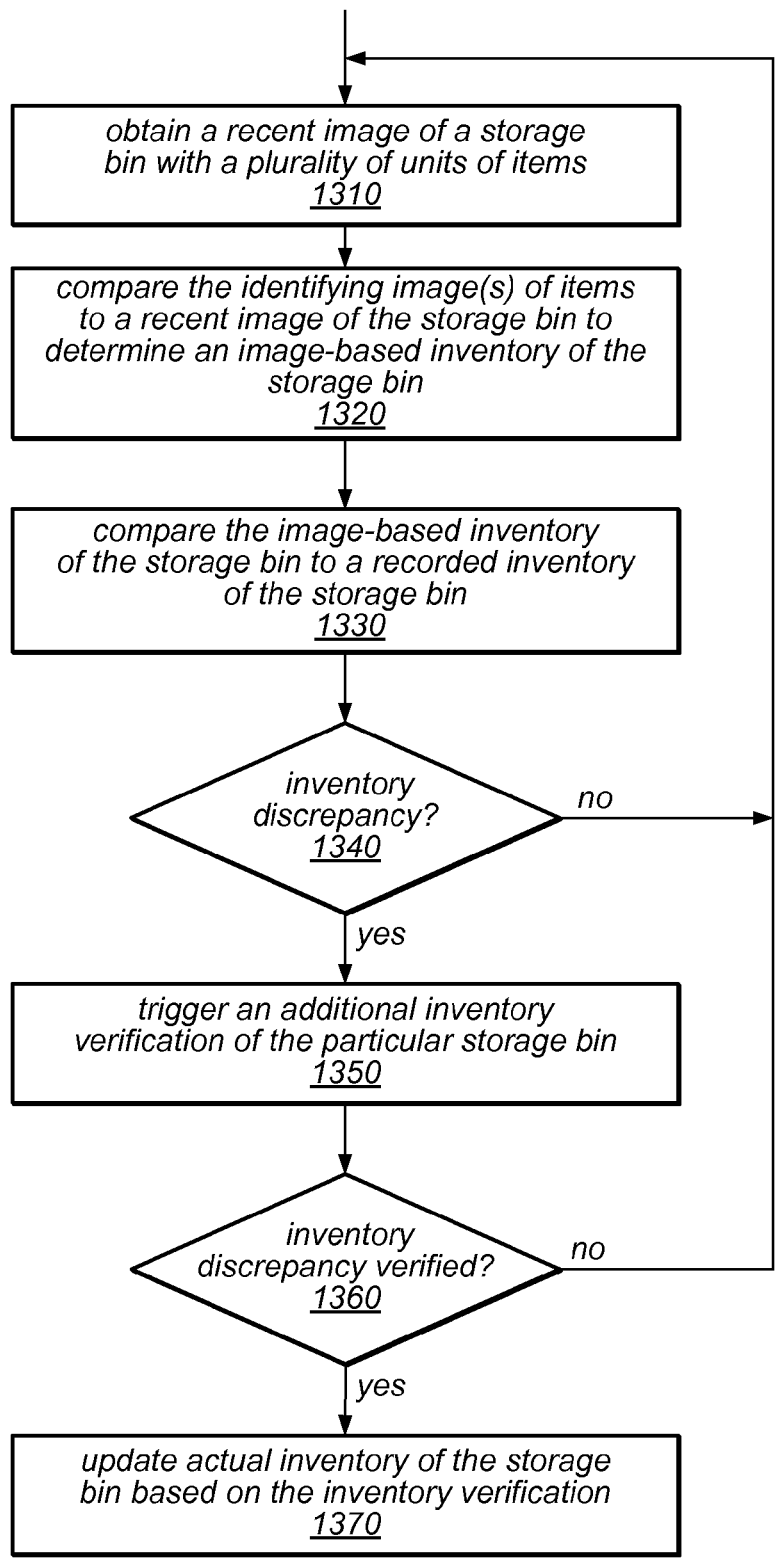
FIG. 13 illustrates a process of inventory verification using item images, according to various embodiments.

Image perspective-dimensioner 306, illustrated in FIG. 4, may also be part of item image component 200. Image perspective-dimensioner 306 may process item images to adjust certain characteristics of the images such as perspective, or to extract data from the images, such as item dimensions. In some embodiments, image perspective-dimensioner 306 is tightly tied, programmatically to the other components 304-312 of item image component 200. For example, image perspective-dimensioner 306 may provide an API or other form of interface for the modules of item image component 200 to directly interact with image perspective-dimensioner 306. Any of various image processing techniques known to one of skill in the art may be applied to the images for various reasons. For example, two images (e.g., a before stow and an after stow image) may be analyzed and processed such that a comparison, or "diff" of the images will result in the identification of an image of the item that was stowed. Any of various techniques known to one of skill in the art may be applied to the images (e.g., perspective adjustment, resizing, color adjustments, image quality adjustments, etc.) in order to prepare the images for the diff such that the resulting image of the item better exemplifies what the item actually looks like as stowed in the inventory location. For example, in various embodiments, image perspective-dimensioner 306 may analyze the positional relationship between a plurality of graphical indicators (illustrated in FIG. 7, described below) to determine a distortion of the before or the after image of the storage location. The image perspective-dimensioner 306 may perform an alignment process, wherein the alignment process includes perspective correction. In other embodiments, qualities of the image, such as horizontal lines or vertical lines may be may be relied upon instead of the graphical indicators illustrated herein (e.g., to perform processes such a perspective correction). Similar processes may be applied when an image of a particular item is compared to an image of an inventory area, to determine if the item is in the inventory area, for example, or to determine an item position. Some of the functionality of image perspective-dimensioner 306 is illustrated in FIGS. 6, 9 and 13, described below.

Various embodiments include comparing captured images. The captured images that are compared may be captured by different devices, for example, mounted devices or mobile devices and from different positions, e.g., from slightly above, from slightly below, from the left or right, from different distances, etc. Furthermore the captured images may have been captured while the capture device itself was at a different orientation. Thus, the images that are compared may be captured from a different position and/or with the image capture device at a different orientation for each image. In some embodiments, graphical indicators in the storage area may be used to analyze the position and/or orientation of the image capture device. In some embodiments, an image may be pre-processed to compensate for the orientation of the capture device during capture of the image. For example, if a mobile image capture device was used to capture the before image of a storage area where the image capture device had a different orientation from the orientation of the image capture device used to take the after image of the storage area, the known attributes of the graphical indicators may be used to determine the different orientation and the images may be pre-processed (e.g., warped or otherwise manipulated) before comparison to compensate for the difference in orientation. In some embodiments the image perspective-dimensioner 306 or another component may perform such analysis and/or processing.

Image difference determiner 308 may be part of item image component 200, as illustrated in FIG. 4. Image difference determiner 308 may determine the difference between two images. As described in one of the examples described above, image difference determiner 308 may compare two images of an inventory area and determine a difference between the two images. The difference may be an image of the item that was missing from one of the images. In another example, image difference determiner 308 may compare a known image of an item to an image of an inventory area to determine if and/or where the item appears in that inventory area. Some of the functionality of image difference determiner 308 is illustrated in FIGS. 6s, 9 and 10, described below.

Identifying image selector 310 is illustrated as part of item image component 200 in FIG. 4. Identifying image selector 310 may select one or more identifying images of an item. For example, image receiver 304 may receive a plurality of images (e.g., numerous before and after images) of an item that has been stowed. The images may be processed by image perspective-dimensioner 306 and image difference determiner 308 may determine images of the stowed item by diffing the processed before and after images. Identifying image selector 310 may analyze the determined images of the item and select one or more of the images as identifying images of the item. Identifying image selector 310 may analyze the images using relatively simple or more complicated techniques. For example, image selector 310 may select any particular image as an identifying image based upon any of numerous image quality characteristics such as color, contrast, sharpness and the like. In another embodiment, identifying image selector 310 may use various machine learning techniques to select one or more identifying image(s) for an item. Various functionality associated with identifying image selector 310 is illustrated in FIG. 6, described below.

Some of the methods disclosed herein may be used to display an image of the item to a picker attempting to pick a unit of an item. Some of the methods disclosed herein may be used to direct the picker to a particular position in the inventory area or storage bin as well. The representative image of the item may be used to determine the position of the item in a particular inventory area. For example, various techniques may be used to compare the representative image of the item to an image of a storage bin holding numerous items. In one example, a recent image of the storage bin from the recent stowing or picking of a unit of another item to or from the storage bin may be have been captured during the stowing or picking. In some embodiments, when the image was captured, an image-based storage bin inventory analysis may be performed. For example, one or more representative images of items expected to be in in the storage bin (e.g., from inventory records) may be compared to the image of the storage bin. When a match is found, a position of the item in the image of the storage bin that is matches may be determined and/or the inventory record may be verified for that item. This process may be repeated for some or all of the items expected to be in the storage bin, as a storage bin inventory check process for example. In some embodiments, such a process may be used to verify that items in a pick list are actually on the shelves indicated by the pick list before the pick list is directed to be picked, thus avoiding the loss of time to missed picks. In some embodiments, the inventory check is performed in an on-going process instead of coordinated particularly with the pick process. Another way to determine the position of the item in the inventory area is to determine the position of the difference between the before and after images of the inventory area where the item was stowed.

The position of a unit of an item may be indicated to an agent tasked with picking the item in numerous ways. For example, the image of the storage bin may be displayed and the position of the item or the item itself may be highlighted or otherwise indicated in the displayed image of the storage bin. Another way to indicate the position of the item in the storage unit is to describe the position of the item to the agent. For example, audible, textual or other graphical instructions may describe to or be displayed to the agent that the item is at the top of the bin, or on the left or on the middle of the third shelf of the storage bin. Determining an item position in a storage bin may be performed ahead of time, dynamically on-the-fly in real-time or near real-time with respect to the agent's arrival at the storage bin or receipt of instructions to pick the item. For example, an image capture device may capture an image of the storage bin when the picker arrives; the image of the storage bin may be compared with the image of the item to determine the position of the item, and the position of the item on the storage bin may be indicated to the picker. Also, in some embodiments, a before image may not be necessary. For example, stored records of the inventory of the storage bin may be used to determine and indicate the position of the item, either before or as the picker arrives at the storage bin of the item to be picked. For example, a record of the position of the item on the bin (determined earlier via the image-based analysis herein or otherwise) may be accessed and indicated to the agent, such as by highlighting the position in a display of a generalized storage unit on a device.

Item images may also be used to perform various inventory analysis tasks, such as inventory audits, for example. An image-based inventory may be kept. For example, images of all the storage units may be retained or positions and/or quantities of items identified by the image-based system may be kept. Inventory shrinkage, human error, failure to follow stowing or picking etiquette and the like may cause a virtual inventory record (e.g., computerized records of inventory) to differ from actual inventory (e.g. inventory actually in the inventory area). Because the images of the inventory area and the items are captured over time, it may be possible to piece together explanations of discrepancies between inventory records and actual inventory, for example. The item images may be used to confirm that actual inventory matches the virtual inventory record and/or to identify discrepancies between the two. For example, using various techniques, item images may be compared to images of storage units that hold various items in order to verify that the items expected to be in the storage bin are actually stored in the storage bin. Such analysis may be performed periodically with various inventory functions, every time an image of an inventory area is captured or at other times without departing from the scope of the invention disclosed herein. Similar processes may be performed for one storage bin, an inventory area or any other subset of the materials handling facility.

Such image-based analysis of the storage bin may be performed prior to sending an agent out to pick from a pick list. Because images of storage bins may be captured any time any item is stowed or picked from the storage bin, a recent image of the storage bin selected for a visit on the pick list may be available and compared with an image of the item expected to be picked. If the item is determined to be missing from the storage bin, another unit of the item from another storage bin may be selected for the pick list, thereby avoiding wasted time at a storage bin that does not have the item to be picked.

Figure 10A:
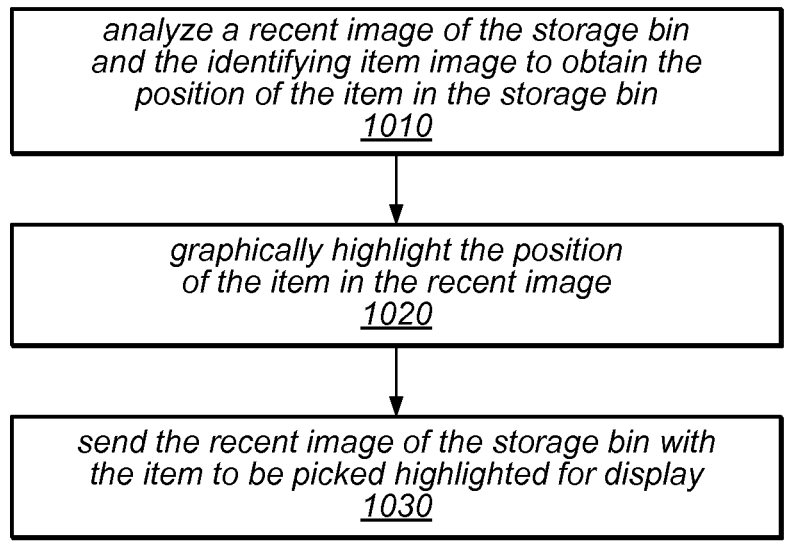
FIGS. 10A-10B illustrate examples of processes for analyzing, highlighting and displaying images of items in inventory locations, according to some embodiments.
Figure 10B:
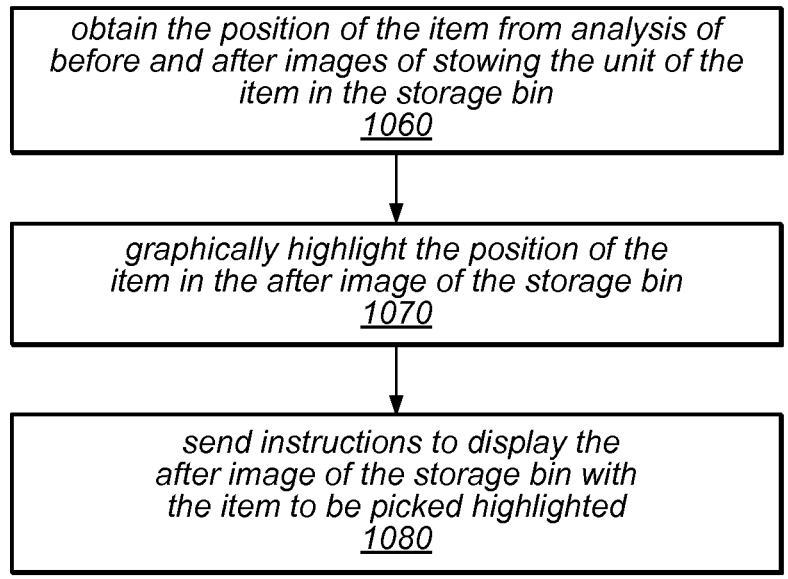

Item image finder 312 is illustrated as part of item image component 200 in FIG. 4. Item image finder 312 may use one or more of the identifying images selected by identifying image selector 310 to determine and/or highlight a position of a unit of the item in an inventory location of the materials handling facility. For example, item image finder 312 may compare an identifying image, or characteristics of an identifying image of the item to images of inventory areas to determine if the particular inventory area includes the item, for any of numerous uses. For example, if the inventory area does not include the item, an inventory record may be updated. If the inventory area does include the item, a position of the item in the inventory area may be determined, for example, either by locating the item image in the image of the inventory area or by applying the dimension information gathered from the image by the image perspective-dimensioner 306. Various functionality associated with embodiments of item image finder 312 is illustrated in FIGS. 9, 10A and 10B, described below.

FIGS. 5A and 5B illustrate a control system 100 coupled to a data store 302 (e.g., product database) in which location, position, and/or descriptive information is stored and associated with the items handled in the materials handling facility. In this example, control system 100 may be configured to consult data store 302 to retrieve information about an item and/or an inventory area and may also be configured to determine what information should be presented to picking/stowing agents for a given picking/stowing operation. For example, during a picking operation, control system 100 may access data store 302 to determine an inventory area from which a picking agent should retrieve an item. The control system may also access position and/or descriptive information such as item images and the like, for the item from data store 302. Control system 100 may be configured to determine how much of the available information should be sent to image capture device 105 to be displayed to an agent and may process the information so that it may be presented to the agent, as described herein.

FIGS. 5A and 5B also illustrate a stowing and picking process, respectively, in an order fulfillment center such as the one depicted in FIGS. 7 and 8, described below. FIG. 5A illustrates an image-based capture/display device 105 in a stowing operation, according to one embodiment. In this example, an agent has been directed to a stationary, multi-shelf section of an order fulfillment center to stow an item with item ID 440 in inventory area 235. As illustrated in FIG. 5A, the agent carries an image capture device 105, which in some embodiments may communicate the agent's location to a control system in the fulfillment center (not shown). In embodiments, image capture device 105 may have been used to direct the agent to the multi-shelf area. In other embodiments, the agent may randomly determine stow locations without direction.

As illustrated in FIG. 5A, control system 100 may generate and send messages including picking/stowing instructions 420 to image-based capture/display device 105, in some embodiments. Control system 100 may in some embodiments access data store 302 or another device to retrieve text-based item descriptions, clip art or other vector-based graphics data (e.g., drawings representing outlines of items or inventory areas), font data, images of items and/or inventory areas, or any other data that may be sent to image-based capture/display device 105 for display. In other embodiments, control system 100 may execute software configured to convert text, graphics, and/or image data into an input format compatible with these image-based display devices (e.g., a machine language or other instruction encoding) before sending it to the devices. In such embodiments, the image-based capture/display device 105 may include relatively simple logic for executing the encoded instructions to present the desired text or images.

In the example illustrated in FIG. 5A, stowing instructions 420 may include a list of one or more items to be picked (i.e., a "pick list"), which may include item identifiers, quantities, identifiers of an inventory area in which each item on the list is stored, and/or instructions for directing an agent within the facility (e.g., path information). In another example, stowing instructions 420 may include a list of one or more items to be stowed, identifiers of the items, identifiers of inventory areas in which each is to be stowed, and/or path information for directing the agent to the inventory areas. Control system 100 may be configured to send a stow list or list of items to be stowed to image-based capture/display device 105 as a text file, in some embodiments. These lists may be presented to an agent all at once, or information about each item on a list may be presented individually, on an as-needed basis.

In this example, the agent has been directed by stowing instructions 420 sent from the control system 100 to the image-based capture/display device 105 to randomly stow the item in an available inventory area. Once the stowing agent reaches the targeted inventory area, control system 100 may send a message (e.g. stowing instructions) to the image capture device to stow the item. In some embodiments, (not illustrated) the message may include location, position and/or descriptive information that may be sent to the stowing agent to aid the agent in locating the particular position in which the item is to be stowed, as described herein. For example, control system 100 may send a text file to the image-based capture/display device 105 that includes a description of where the item should be stowed (e.g., "top shelf, $3^{rd}$ from right," or "to left of blue box").

The instructions may be explicit or the agent may be familiar with stowing etiquette that directs the agent to follow a certain protocol when randomly stowing an item. For example, to stow an item, the agent may scan the item ID 440, scan the inventory location identifier 445, stow the item and scan the inventory location ID 445 again after stowing the item. In some embodiments, a before image may be captured before the item is stowed (e.g., triggered by the scan of the inventory location identifier 445 before the stow) and/or an after image may be captured after the item is stowed (e.g., triggered by the scan of the inventory location identifier 445 after the stow).

After the item is stowed, the method may include storing an indication of the inventory area and/or location/position information for the stored item in a product database, such as data store 302. This indicator may include a description of the inventory area, an inventory area location number, or other data representing the inventory area in which the item is stored in the facility, indexed by a product identification code, for example. In some embodiments, an indicator of the item's specific position within the inventory area may be associated with the corresponding item's identifier, and may be stored in such a database along with an identifier of the item and/or an identifier of the inventory area. In some embodiments, dimension information, and/or other descriptive information may also be stored in the database along with position information at this time, while in other embodiments such information associated with the item may be stored separately and/or at a different time. As previously described, an identifier of the item may include an item's inventory identification number, Universal Product Code (UPC), Stock-Keeping Unit (SKU) code, model number, version number and/or other designation (including proprietary designations), according to various embodiments.

FIG. 5A illustrates that the item identifier 440, inventory location identifier 445 as well as the before and after images may be sent to data store 302. In an actual implementation, the item identifier 440, inventory location identifier 445 as well as the before and after images may be sent from the image capture device 105 to the data store via the control system 100 and/or item image component 200.

As illustrated in FIG. 5B, the system and methods described above regarding a stowing operation may be similarly applied to a picking operation. For example, control system 100 may send similar messages to image-based capture/display device 105 for directing a picking agent to a particular inventory area to pick an item. When the picking agent reaches the targeted inventory area, control system 100 may send a message to the image-based capture/display device 105 that includes item identifier 440, inventory location identifier 445, highlighted item image 447 and item image picking instructions 460 to aid the agent in locating the particular item to be picked, as described herein. In some embodiments, control system 100 may be configured to access a data store 302 to obtain such information for an item to be picked. For example, control system 100 may retrieve a text file from data store 302 that includes a description of the item and/or its position within the inventory area (e.g., "bottom shelf, orange mug," "$2^{nd}$ book to right of *War and Peace*," or "green DVD, white logo"). In another example, control system 100 may retrieve an image file from data store 302 that shows what the item looks like as it is stored in the inventory location. These retrieved files may be sent to the image-based capture/display device 105 by the control system, so that the image-based capture/display device 105 may display the information and/or images to the picking agent.

FIG. 5B illustrates an image-based capture/display device 105 in a picking operation, according to one embodiment. In this example, an agent has been directed to a multi-shelf section of an order fulfillment center to pick an item with ID 440 from inventory area 235. As illustrated in FIG. 5B, the agent carries an image-based capture/display device 105, which, in some embodiments may communication the agent's location to a control system in the fulfillment center (not shown). In embodiments, image-based capture/display device 105 may have been used to direct the agent to the multi-shelf area. In still other embodiments, image-based capture/display device 105 may present all or a portion of a pick list to the agent that includes item 440 in inventory 235. Such a pick list may indicate that the item is a book, and may include the title of the book, for example. In various embodiments, image-based capture/display device 105 may receive information from a control system controlling the filling of orders to present to the agent as will be described below regarding FIGS. 9, 10A and 10B. The information may include picking instructions 460 as well as an item ID 440, inventory location identifier 445 that identifies the inventory location, and an identifying item image 447 that visually identifies the item 440 as the item appears in the inventory location. Image-based capture/display device 105 may display some or all of the picking instructions 460 as well as an item ID 440, inventory location identifier 445 and/or the identifying item image 447. The agent may use some or all of this information in order to pick the item as directed.

The picking instructions 460 of the picking process may be explicit or the agent may be familiar with various rules or picking etiquette that directs the agent to follow a certain protocol when picking an item. For example, if there are multiple units of the item in the storage location, the agent may be directed to, or may understand that pick etiquette dictates picking the unit of the item on the left. To pick the item, the picker may scan the inventory location, pick the item, and then scan the inventory location the item was picked from once again. In another embodiment, the agent may scan the inventory location once, either before or after the pick. One or more item images (e.g., recent item images) may be captured during the picking process (perhaps triggered by the scan of the inventory location). In some embodiments, the inventory location identifier that was scanned as well as the captured item image 490 may be sent from the image-based capture/display device 105 to data store 302. While the item image 490 may not include an image of the item that was picked (e.g., if the item image was captured after the pick), the item image 490 may include the most recent image(s) of other item(s) in the storage location. In some embodiments, before and after images may be captured as part of the pick process. In some embodiments, the recent image of the other items may be used for various processes, such as the one illustrated in FIGS. 9, 10A and 13, described below. In an actual implementation, the various identifiers and images may be sent from the image-based capture/display device 105 to the data store 302 via the control system 100 and/or item image component 200.

The picking process may include determining an inventory area in which the given item is stored. For example, in some embodiments a control system, such as control system 100, may access a product database, such as data store 302, in order to obtain stored location information, position information, and/or an image of the given item. This information may have been stored when the given item was stowed, as described above, or at another time, in different embodiments. For example, an image of the item may be captured and stored when an item is received at the facility, or location information may be stored when a targeted inventory area is determined, but before it is stored. In some embodiments, the control system may also obtain information about other items stored in the same inventory area from the product database.

If the agent is able to locate the item, he or she may remove the item from the inventory area, or "pick" the item. In some embodiments, when an item is picked, an indication of success may be sent to the control system, which may update the product database to reflect the removal of the given item. The control system may also update position information for one or more of the remaining items in the inventory area based on the removal of the given item. If the item was found in the inventory area, but not in the position indicated by the presented position information, the agent may provide feedback to the control system indicating that that an error was detected in the determined and/or stored position information for the item (not shown). In some embodiments, the agent may capture an image of the misplaced item in the wrong position.

After the item is picked, the method may include verifying that the correct item was picked. For example, in some embodiments, when the picking agent picks the given item, he or she may scan an identifier of the item (e.g., using a handheld communication device such as a scanner or an image-based capture/display device 105). An identifier of the item may include an item's inventory identification number, Universal Product Code (UPC), Stock-Keeping Unit (SKU) code, model number, version number and/or other designation (including proprietary designations), according to various embodiments. The picking agent may send, the item identifier to the control system (e.g., using the communication device), which may compare the identifier to that of the item on the pick list. In such embodiments, the control system may send an indication to the picking agent that the correct item was or was not picked by sending the indication to the communication device and/or to the image-based capture/display device 105 to be presented to the agent.

In some embodiments of picking or stowing, before and after images may both be retained for any of various reasons. For example, before and after images may be used to determine the position of a stowed item to facilitate locating and picking the item. In another example, before and after images may be used to determine what the item looks like when stowed. In yet another example, before and after images of a pick may be used to verify that the correct item was picked. Other uses are contemplated as well.

Figure 8:
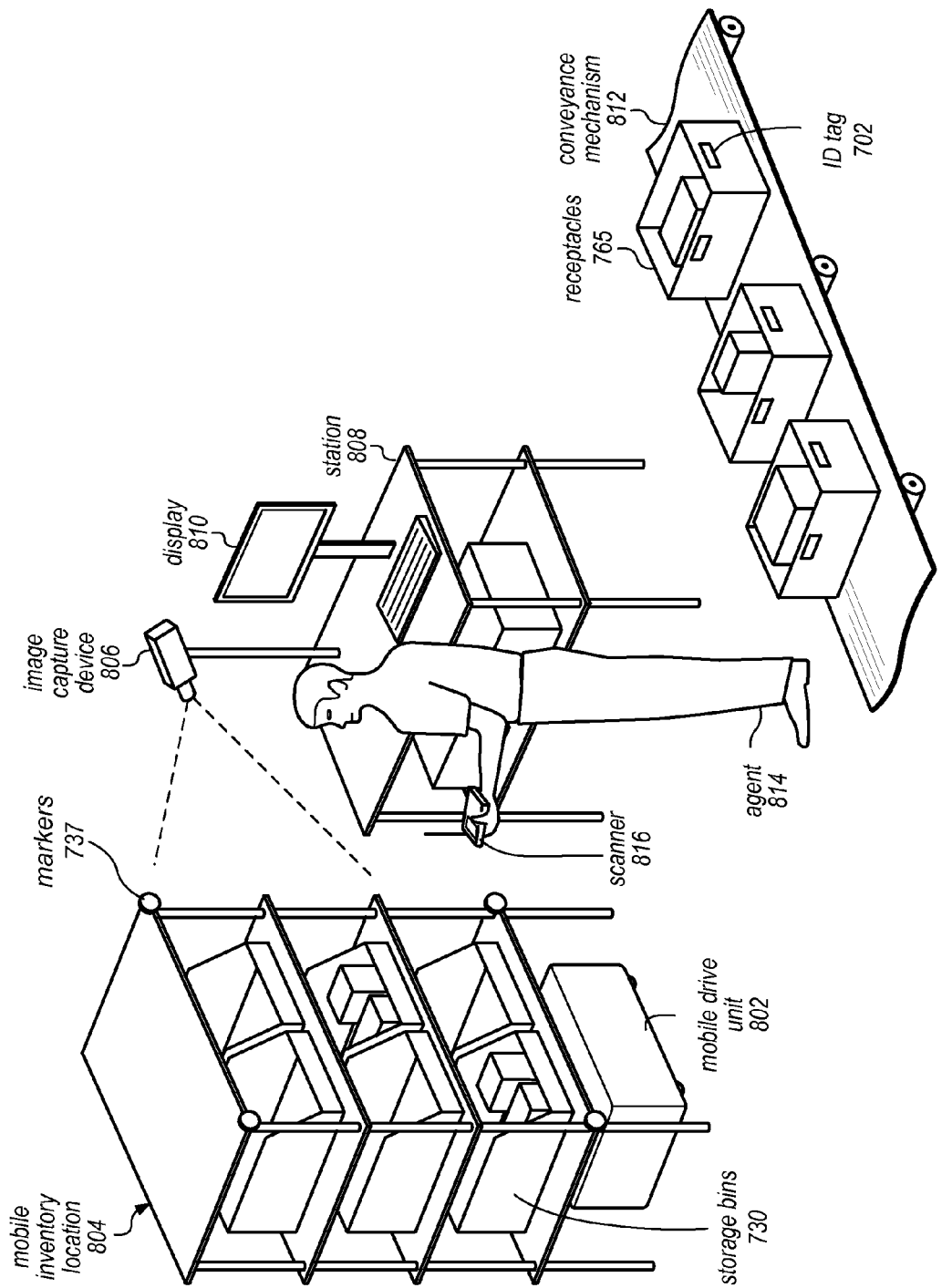
FIG. 8 is an illustration of a fulfillment center with mobile inventory locations, according to some embodiments.

While FIGS. 5A and 5B illustrate the use of an image-based capture/display device 105, similar functionality may be achieved by using various combinations of image-based capture/display devices, image-based display devices, image capture devices, scanners and/or handheld communication devices in a stowing or picking operation as illustrated in FIG. 8, described below.

As described above, the information retrieved from data store 302 (e.g., stowing instructions 420), may be processed by control system 100 into various messages and communicated to image-based capture/display device 105. In some embodiments, control system 100 and the image-based capture/display device 105 may each be configured to communicate wirelessly, for example via radio communication or wireless networking, to convey instructions and information from control system 100 to image-based capture/display device 105 for display to agents. In other embodiments, they may communicate via a wired connection protocol.

In embodiments in which the image-based capture/display device 105 is configured to receive encoded location, position and/or descriptive information and to analyze or interpret it for display, the number of bytes required to transmit the location, position, and/or descriptive information may be small enough that attaching it to a message that is already being sent may be more efficient than the overhead required to send another message just for the additional information.

While several examples described herein involve the identification of items such as books, CDs, and DVDs, position information and/or descriptive information may be utilized with generally any kind of item, including, but not limited to electronic devices, clothing, toys, hardware, materials, and/or other items according to various embodiments. For example, position information and/or additional descriptive information (e.g., other than a title) may aid in identifying a book from among several books, as illustrated in inventory area 235, or in identifying a CD from among other CDs in inventory area 235, or a DVD from inventory area 235.

In some embodiments, position information and/or additional descriptive information such as item images may be presented optionally and may not be presented for an item that is already easily distinguishable from other items. For example, an agent instructed to pick a video camera from inventory area 235 may not utilize any position or additional descriptive information since an item description on a pick list (e.g., "video camera") may be enough to locate the correct item, in one embodiment. However, position information and/or additional descriptive information such as an item image may be presented for another item in the same inventory area, according to one embodiment. For instance, position or additional descriptive information such as an item image may be presented to locate one of the books that are also in inventory area 235. In some embodiments, position and/or additional descriptive information may be presented for certain items and not for others in the same inventory area, depending upon various similarities of an item to be picked to other items in the inventory area. Thus, in some embodiments, position and/or additional descriptive information, such as item images, may be presented only if necessary. Only presenting additional information when necessary may save network bandwidth or other compute resources, in certain embodiments.

While the examples illustrated in FIGS. 5A and 5B include a data store 302, coupled to control system 100, in which location, position and/or descriptive information for items and inventory areas is stored, in another embodiment, control system 100 may access some or all of this information across a network from another device configured to store and provide such information (not shown).

As described above, the amount and type of information to be presented in such a display may be determined by the control system, and may be dependent on whether the item is readily distinguishable from other items in the inventory area, a track record of one or more agents in picking this item or other similar items, on guidelines associated with this or similar items, or on other factors, in different embodiments. For example, in some embodiments, a complete description of an item (including, for example, a title, pattern information, size or dimension information, item image, shape, and/or position information) may be displayed all at the same time, while in other embodiments, a "rolling" description may be displayed such that more information is presented the longer it takes the agent to locate the item.

FIG. 6 illustrates a flow diagram of an identifying item image capture, determination and linking process. The process illustrated in FIG. 6 may be performed in materials handling facilities such as those depicted in FIGS. 7 and 8, described below. In some embodiments, any time a single item is added or removed from inventory, a before and after image may be captured and processed as illustrated in FIG. 6. Although, in one embodiment, only after images are used. For example, one after image of another item being picked or stowed in the same inventory location may be used as the before image for another item that is later picked from the same inventory location. As long as no other items were picked or stowed from the inventory location in-between, a diff of the after image from the other item and the after image from the pick or stow of the more recent item should provide an image of the more recent item as the item appeared in the inventory location. Such a process may eliminate the need for capturing both a before and after image for any particular pick or stow action. In some embodiments, the item image component 200 or the control system may be configured to operate regularly in a mode where both before and after images are captured during each pick or stow operation, such as when an inventory location is scanned, for example. In other embodiments, the item image component 200 or the control system may be configured to selectively direct capture of either before or after images during any particular pick or stow operation, perhaps based on whenever an image already exists, for example. In yet another embodiment, the item image component 200 or the control system may be configured to regularly capture after images only during pick or only during stow operations. The item image component 200 or the control system may be configured to stop capturing item images of a particular item after an identifying image of the particular item has been selected or may be configured to start capturing images of particular items when packaging for the item has changed.

Continuing with FIG. 6, at 610, a before image of a storage bin before a unit of an item is stowed to or picked from the storage bin may be received. For example, an image capture device 105 may capture a before image of a storage bin before an agent stows or picks an item and send the captured image to data store 302 via item image component 200. At 620, an after image of the storage bin after the unit of the item is stowed to or picked from the storage bin may be received. For example, an image capture device 105 may capture an after image of a storage bin after an agent stows or picks an item and may send the captured image to data store 302 via item image component 200. In either case, image receiver 304 may receive any or all of the images and transfer the images to data store 302. At 630, an image of the unit of the item may be determined based on a comparison of the before and after images. For example, image perspective-dimensioner may access the before and after images from data store 302 or from image receiver 304 directly, and may process either or both of the received before and after images such that image difference determiner 308 may perform a diff of the before and after images. The difference between the before and after images may be an image of the item that was stowed or picked.

At 640, one or more analysis techniques to select identifying image(s) from the determined item image(s) may be applied. For example, identifying image selector 310 may analyze the item images of an item with relatively simple image analysis such as comparative image quality among multiple images of the item or some threshold measure of image quality, or image selector may analyze the item images using machine learning techniques. As illustrated at 650, if a minimum confidence level of the identifying image is not reached, the process may return to receiving before and after images at 610 and 620. In some embodiments, a minimum confidence level may be configurable or based upon a simple threshold number of available item images, while in other embodiments, a minimum confidence level may be based upon machine learning techniques, such as those that refine and improve the selected identifying image of the item over time. If a minimum confidence level of the identifying image is reached, identifying item image(s) may be linked with the item, as illustrated at 670. For example, if the item is stored in inventory in a six-sided box, the system may be configured to select 6 representative images of the item, one for each side of the box. In this manner, the system may be more likely to recognize the item in an image no matter which side of the box appears in the image of the inventory location image, as described with regard to FIG. 9, below. The selected identifying image(s) may be linked to the item in any number of ways readily recognizable to one of ordinary skill in the art (e.g. a database entry or the like).

Various embodiments disclosed herein may implement an item image capture process for gathering and using images of items as the items appear in an inventory location of a fulfillment center. FIGS. 7 and 8 illustrate fulfillment centers with stationary and mobile inventory locations, respectively. Various processes may be carried out in the illustrated locations of FIGS. 7 and 8, for example, the processes illustrated in FIGS. 6, 9, 10A and 10B.

Figure 7:
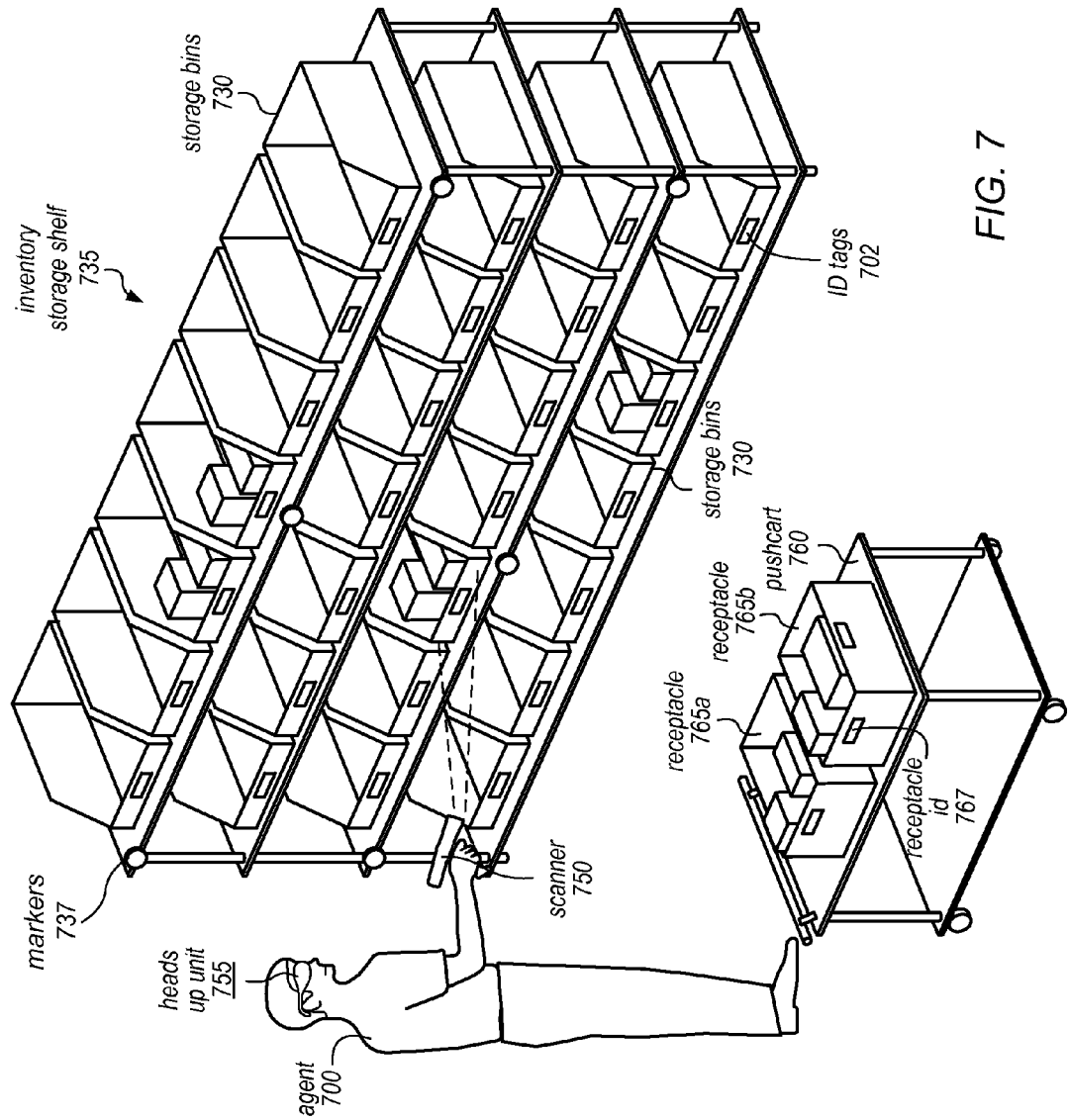
FIG. 7 is an illustration of a fulfillment center with stationary inventory locations, according to different embodiments.

FIG. 7 is an illustration of a fulfillment center with stationary inventory locations (e.g., inventory storage shelf 735) with markers 737. FIG. 7 generally illustrates an agent 700 scanning one of the id tags 702 of one of the storage bins 730 and capturing an image of items in the storage bin. As illustrated, the agent 700 may either be stowing items from receptacles 765a-b of pushcart 760 to inventory storage bin 730 or picking items from inventory storage bin 730 and placing the picked items into receptacles 765a-b of pushcart 760. In some embodiments, a mobile image-based display device (e.g., one that travels along with an agent as he or she traverses the facility during picking and/or stowing operations such as a heads-up unit 755 and a scanner 750 may be used by agent 700 to determine the position of an item in an inventory location (e.g. storage bins 730) of inventory storage shelf 735. In various embodiments, the functionality described herein may be divided any number of ways between the scanner 750 and the heads up unit 755. For example, in some embodiments, the scanner 750 may not display images at all, instead relying upon the heads up unit 755 to display images of the items to be picked. In some embodiments, a heads up unit 755 may capture images of items in the inventory locations instead of or in addition to the scanner 750. For example, the scanner 750 may capture a close up image of the item when the id tag 702 is scanned, while the heads up unit 755 may capture an image of the item that includes more of the contextual imagery surrounding the item such as other items and a portion or all of the inventory storage shelf 735. In other embodiments, a single device may perform some or all of the disclosed functionality.

As illustrated in FIG. 7, an agent may use one or more display devices in a picking or stowing operation, in addition to one or more scanners 750. In this example, agent 700 carries scanner 750. This scanner 750 may be similar to image-based capture/display device 105 of FIG. 11, in some embodiments. For example, scanner 750 may be configured to receive picking or stowing instructions from a control system 100; to direct agent 700 to inventory storage shelf 735; to scan, enter, capture an image of or record information about a picked or stowed item; or to request and/or present additional information to agent 700 to help the agent locate an item or a particular storage bin of storage bins 730, in different embodiments.

As illustrated in FIG. 7, agent 700 may in some embodiments use a head-mounted display device 755 (also known as a "head up" display) as a communication device, and this device may be configured for hands-free control. Such a display device may be configured to receive and display picking or stowing instructions, to direct agent 700 to inventory storage shelf 735, or to provide additional information to agent 700 to help him or her locate an item or a particular storage bin of storage bins 730, in different embodiments. In other embodiments, other types of head up display devices may be used (e.g., one implemented as a monocle on a headset or helmet) instead of, or in addition to, an image-based display system to display information and images of items sent from a control system in the facility.

In this example, receptacles, pushcarts, and/or inventory areas in the materials handling facility may be equipped with ID tags 702 (e.g., RFID tags). Each ID tag 702 in the materials handling facility may include a unique identifier that uniquely identifies the ID tag at least within the materials handling facility. The location of each receptacle or other asset within a materials handling facility to which an ID tag is attached, and/or other information relevant to the receptacle or other equipment to which the ID tag is attached, may be associated with the unique identifier of the ID tag and stored such that it is accessible by a control system in the facility. Agents within the materials handling facility may be equipped with ID readers, which may be integrated in or attached to gloves, wristbands, or other devices worn or carried by agents. The location of each receptacle to which an ID tag 702 is attached may be associated with a unique identifier of the ID tag.

FIG. 8 illustrates a fulfillment center with mobile inventory locations 804 that are moved to and from station 808 by mobile drive unit 802, according to some embodiments. In some embodiments, the illustrated station may be configured to carry out the processes illustrated herein (e.g., FIGS. 6, 10A and 10B). For example, stationary station 808 may be manned by agent 814 holding scanner 816. Station 808 may be equipped with image capture device 806 that may function separate from or in cooperation with scanner 816. In some embodiments, the devices may be coordinated by messages to and from control system 100. Generally, an agent may receive instructions from scanner 816 or a display 810 to stow or pick items to or from the storage bins 730 of mobile inventory location 804. The agent may place or induct the picked items onto a conveyance mechanism 812. In some embodiments, items are individually inducted into receptacles 765 that are placed on the conveyance mechanism 812. In some embodiments, mobile inventory location 804 may have markers 737.

Image capture device 806 may capture images of items on mobile inventory location 804, for example when an item is picked from or stowed to a storage bin 730 of mobile inventory location 804. In some embodiments, an image may be captured by image capture device 806 when the agent scans an ID for one of storage bins 730, for example, whenever an item is picked or stowed.

In some embodiments, scanning an identifier of a nearby inventory area may be performed as part of the normal picking and stowing operations to identify to the control system the inventory area from which an item was picked or the inventory area into which an item was placed.

In some embodiments, rather than using a computer-based communication device (e.g., an image-based display system or handheld communication device, as described herein) to present picking instructions to an agent, printed pick lists may be used in conjunction with an image-based display device or a head up display device to locate items in inventory. For example, a printed pick list may include only an item identifier (e.g., SKU number or title of an item), while position and/or descriptive information such as an image of an item may be communicated by a control system to a head up display, or other transparent or semi-transparent display device configured to present position information in front of a picking agent's eyes while still allowing a picking agent to see through the display. For example, the agent may scan an item on the pick list and the display device may display an image of the item as the item appears in inventory.

As can be seen from the examples illustrated in FIGS. 1, 5A and B, 6, 7, 8, 9, 10A and B, 11 and 13, various combinations of fixed-location image-based display devices and portable image-based display devices may be used to capture and display images of items in various inventory locations for the facility. The selection of devices and/or combinations of devices to be used in a given facility may be dependent on a variety of factors, including, but not limited to: the area that can be covered by each type of image-based display device, the total area of the facility to be covered, safety issues (e.g., issues involving the brightness and/or power of the displays, and the availability and use of safety goggles), the supported angles of displays (e.g., ceiling-mounted image-based display devices might not be suitable for a facility with 30-foot high ceilings and 3-foot wide aisles), or the complexity of the signals supported (and thus of the complexity of device displays that may be achievable).

As described above, the control system in a materials handling facility may be configured to send all of the information needed for a picking or stowing operation to an image-based display system at the same time (e.g., at the beginning of the operation) or may be configured to send information to the laser-based display system on a just-in-time or as-needed basis, dependent on the location of an agent performing the operation and on the status of the operation in progress, in different embodiments. In one such embodiment, a communication device or indirect asset tracking device may be connected to a proximity awareness system and may thus be configured to automatically request position and/or descriptive information when the agent is approaching the proper inventory area. Thus, the communication device, image capture/display device, control system, and/or a proximity awareness system may be configured to coordinate their functions such that an agent receives the information (e.g., through an image-based display device near the agent) when it is needed, thus mitigating the time the agent waits for the information to be received and presented.

The amount and/or type of information supplied to an agent using an image-based display device may vary from item to item based upon various optimization rules, according to certain embodiments. For instance, the control system or item image component may include a set of rules, heuristics, or polices that determine the amount and type of information needed to locate, identify, or distinguish an item with at least a certain level of confidence. In some embodiments, the control system or item image component may be configured to perform various types of analysis, possibly in conjunction with optimization rules or policies, in order to determine the amount and/or type of information that should be provided when picking a particular item. Thus, in some embodiments, rather than always sending all the information available for an item, only a minimum amount of information, such as determined by optimization rules, heuristics or policies, may be initially provided to picking agents.

As described above, multiple picking agents may be picking items at the same time in an order fulfillment facility and, for some orders, no single agent may pick all the items for a single order. Instead, in some embodiments, each of several agents may pick one or more items for an order and transfer those items to a sorting station. An image-based display system may display images of item to each agent to aid in locating items within the inventory areas.

FIG. 9 illustrates a flow chart of a process for picking items using an image-based capture/display device. In some embodiments, the process may be performed by control system 100 and/or item image component 200. The particular process illustrated includes a step for determining an image-based inventory. Other embodiments may not include this step. The image-based inventory determination may be performed after a stow process too. An image-based inventory verification process is illustrated in FIG. 13.

At 930, a pick list may be determined. For example, the control system may receive a list of items needed to fulfill an order and may determine which units of items are to be picked from the units available in inventory records. The determined units of items may be listed in a pick list. At 940 an agent or a storage bin may be directed to a pick location. For example, control system 100 may direct an agent to a stationary inventory location or a mobile drive unit 802 to move a mobile inventory storage bin 804 to station 808. At 950, a recent image of the storage bin with the unit of the item to be picked highlighted for display may be sent and instructions directing picking of the unit of the item from the storage bin may be sent. For example, control system 100 and/or item image component 200 may send a recent image of the storage unit with the item to an image-based capture/display device 105 and may send textual instructions directing the agent to pick the unit of the item from a particular storage bin.

At 960, an after image of the storage bin captured after picking of the unit of the item from the storage bin is received. For example, control system 100 and/or item image component 200 may receive the after image and send the image to data store 302 or to various components of item image component 200 for processing. At 970, identifying images of other items are compared to the after image of the storage bin to determine an image-based inventory of storage bin 970. In some embodiments, item image component 200 receives the after image and compares identifying images of other items, received from data store 302, to the after image to determine what other items are contained in the image. This and similar processes may be used to determine the inventory of items of the storage bin or inventory location, for example.

At 980, it is determined whether more items are to be picked. For example, control system 100 or an image-based capture/display device 105 may determine if any more items appear on the pick list. If more items do appear on the pick list, it may be determined that there are more items to pick and the process returns to 940 where the agent is directed to a pick location or a bin is directed to a pick location (e.g., a station). If no more items are on the pick list, the picked items may be directed to a next station as illustrated at 990. For example, instructions issued from control system 200 may direct an agent, via an image-based capture/display device 105, to push a cart though stationary inventory locations and to take the picked items to sorting 150 as illustrated in FIG. 7. In another example, picked items from mobile inventory location 804 that were inducted onto conveyance mechanism 812 may be directed to various stations downstream of conveyance mechanism 812 (e.g., a sorting station 150 or packing station 160) as illustrated in FIG. 8.

FIGS. 10A and 10B illustrate alternative processes for carrying out block 950 of FIG. 9. FIG. 10A illustrates a process for determining and highlighting the position of an item in a storage bin using a recent image of the storage bin and an identifying image of the item. FIG. 10B illustrates a process for determining and highlighting the position of an item in a storage bin using the before and after images of a stow or pick operation.

At 1010, a recent image of the storage bin and the identifying image are analyzed to obtain the position of the item in the storage bin. For example, item image finder 312 may retrieve a recent image of the storage bin from data store 302 and analyze the recent image by comparing one or more identifying items images of an item to portions of the recent image to determine if the identifying image(s) of the item matches an item in the recent image. If a match is found, the position of the matched image may be determined within the recent image. In some embodiments dimension information about the item may be retrieved from data store 302 and used along with the matching image to determine the position and size of the item in the recent image. In other embodiments, image perspective-dimensioner 306 may analyze the recent image and determine the dimensions of the item At 1020, the position of the item in the recent image may be graphically highlighted. For example, the determined position of the item from 1010 may be covered in a translucent color, outlined in contrasting color, increased in brightness, etc. For example, the known dimensions of the item may be used as a guide for the size of the translucence or outlining to be applied, while the position of the pixels where the match was determined may be used to orient the translucence or outlining. For example, the dimensions of the item may be converted into an appropriate area of pixels and that area of pixels may be centered, or otherwise oriented over the area where the match was found. At 1030 the recent image of the storage bin, with the item to be picked highlighted, may be sent for display. In some embodiments, control system 100 may send the highlighted recent image of the storage bin to an image-based capture/display device 105 for display to the agent.

As described above, FIG. 10B illustrates a process for determining and highlighting the position of an item in a storage bin using the before and after images of a stow or pick operation. At 1060 the position of the item may be obtained from analysis of before and after images of stowing the unit of the item in the storage bin. For example, image difference determiner 308 and item image finder 312 may work together to analyze an image of the storage bin from data store 302. Image difference determiner 308 may determine the difference between the before and after images. For example, the difference between the images should be an image of the item. Once the difference is determined, the position finding functionality of item image finder 312 may be applied to determine the position of the item (e.g. the position of the pixels where there was a difference between the before and after image). At 1070, the position of the item in the after image of the storage bin may be highlighted. For example, the position of the pixels where the difference was found can be determined and used to position and translucence or outline of the item in a similar fashion as described for 10A, above. At 1080, instructions may be sent to display the after image of the storage bin with the item to be picked highlighted. In some embodiments, item image finder may highlight the item in the after image and control system 100 may send the highlighted after image to an image-based capture/display device 105 for display to the agent.

Figure 11:
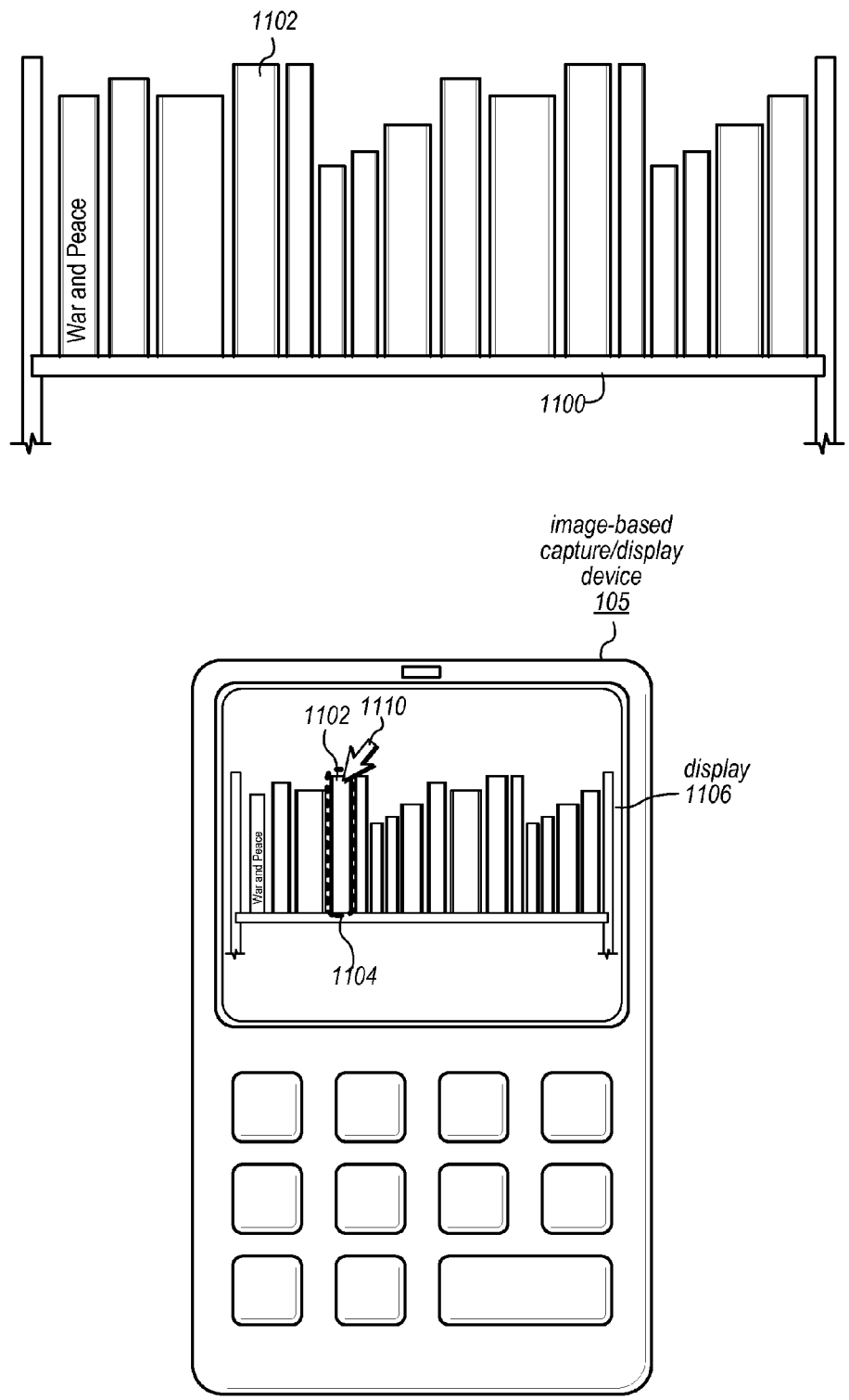
FIG. 11 is an illustration of an image-based capture/display device displaying an image of a highlighted item as the item appears in an inventory location, according to various embodiments.

FIG. 11 illustrates an image-based capture/display device 105. For convenience and as used herein, an image-based capture/display device may be referred to as an image-based capture device, an image-based display device, a display device, a capture device, image-based display system or simply, a device. Image-based capture/display device 105 may, in various embodiments be configured to receive encoded program instructions, text files, graphics files, and/or image data from control system 100.

Image-based capture/display device may be configured as a communication device that performs various of the communication functions described herein. However, the communication features may also be performed with a communication device that does not include all of or only includes some of the image capture features described herein. Furthermore, scanners may also be configured with or without various of the communication and image capabilities disclosed herein.

The devices (e.g., handheld, handheld display, heads-up display, stationary display, scanners, display scanners, etc.) employed in a materials handling facility may utilize any of various known image capture and image display technologies. In some embodiments, the image capture and display devices and/or control system may be coupled to one or more sensors, scanners, RFID readers, or cameras usable for various functionality (e.g., determining the locations of the device, and perhaps thereby determining the location of the agent) in the facility with respect to one or more references within the facility whose locations are known). The control system may also be coupled to a product database or other data store configured to store respective location and image information associated with each item handled within the facility to a data store. The location information for each item may indicate a location at which the item is or was stowed or a location at which the item is to be stowed (e.g., the location at which the control system determines it should be stowed). In some embodiments, the control system may be configured to access the stored location information for a given item when determining the targeted inventory area for picking or when determining a path to the targeted inventory area for picking Such a product database may also be configured to store position and/or descriptive information such as item images for example, which may be accessed by the control system and used to generate the various guidance messages, item images and item position information to be sent to the devices. However, in some embodiments, item images may be stored separately from the position and/or descriptive information. In some embodiments, labels or other indicia in the storage area may be captured in the images and used to determine the position or location. Item locations and item images including or excluding contextual storage location images may be gathered. Images may be captured at the same time (e.g., during scanning while stowing or picking) or gathered separately from the location information.

Various image capture devices may orient themselves with regard to positioning suitable for image capture. For example, an image capture device mounted at a position near a work station that receives moving storage bins may orient itself toward a particular portion of the storage bin where the item to be picked or stowed is located within the storage bin. Such orientation may be performed in conjunction with markers on the storage bin that indicate location and/or size. Indications of size and location may be used during image processing and/or comparison. Alternatively, an image capture sensor mounted on a scanner device for example, may use various mechanical mechanisms to orient itself with regard to where the item is expected to be at the time of image capture. For example, the device or system may be configured to recognize that some storage bins in an area store items above a storage bin id while other storage bins store items below a storage bin id. The device may orient the image sensor to capture the image of the item and the storage bin accordingly. Alternatively, the device may comprise multiple image sensors to capture the image of the item and storage bin.

In some embodiments, software drivers for displaying received text, graphics, and/or image files may be executed by processors on the various image-based capture/display device 105. For example, various image-based capture/display devices 105 may be configured to accept and display information received in one of several vector graphics formats or raster graphics formats, such as a Microsoft Windows bitmap (BMP), computer graphics metafile (CGM), graphic interchange format (GIF), PC Paintbrush format (PCX), JPEG file interchange format (JPEG), tagged image file format (TIFF), scalable vector graphic (SVG), Microsoft Windows media format (WMF), progressive graphics file (PGF), raw image format, portable network graphics (PNG), HD Photo (HDP), X Pixmap (XPM), Multiresolution Seamless Image Database (MrSID), and/or other formats.

A materials handling facility may in various embodiments include different arrangements of fixed-location and/or movable image-based capture and/or display device 105. For example, in some embodiments, an array of such devices may be mounted on the ceiling of the facility, and/or a series of such devices may be mounted on walls, floors, poles, or shelving units within the facility. These image-based capture and/or display devices 105 may be networked together (e.g., wirelessly or by wire) and/or configured to communicate with a control system, such as to receive messages from the control system that include instructions executable to initiate displaying location information, position information, descriptive information, item images, storage location images and/or path information to agents within the facility. The image-based capture and/or display device 105 may also be configured to receive messages from a control system or from an agent (e.g., via a handheld remote control device) including instructions executable to alter their position (e.g., their orientation and/or angle). For example, an image-based capture device may be directed to rotate, sweep, or point in a particular direction in order to capture an image of an item. Some image-based capture and/or display devices may implement both image capture and image display functionality. Other image-based capture and/or display devices may implement image capture functionality or image display functionality, but not both.

Once a picking agent has reached the inventory area the agent was directed to, an image-based capture and/or display device 105 may display (or project) additional visual guidance for identifying and/or locating the particular item to be picked. For example, the image-based capture and/or display device 105 may display an image of the item or an image of the item as the item appears in the inventory location, a symbol or icon representing an item's position, or any other information suitable for identifying, highlighting or locating the item to be picked. In some embodiments, the control system may store position and dimension information for some or all of the items stowed in the inventory area, and an image-based display device may be programmed to display an image of the position or dimension of the items based on the position or dimension information stored by the control system. Alternatively, the item's position or dimension may be determined based on the dimensions (e.g., width) and/or the relative positions of the other items in the inventory area.

For example, if analysis of an image of the item in an inventory area determined the item be the 3rd item from the left on a particular shelf and to be 3 inches wide, and the first two items in the image are analyzed and determined to be 2 inches wide and 1 inch wide, respectively, the image-based capture and/or display device 105 may be programmed to display a highlighted position between 3 and 6 inches from the left edge of the shelf in the image of the inventory location, where the item should be located. One of ordinary skill in the art will recognize many other ways to make the position of the item stand out from the rest of the inventory area in the displayed image. For example, an arrow may be displayed as pointing to the item, a translucent overlay in some contrasting color may overlay on top of the actual image of the item in the image of the inventory location, or the edges of the item may be overlaid with a dotted line, etc.)

As illustrated in FIG. 11, image-based capture/display device 105 may display via display 1106, inventory location 1100 that stores book 1102. As illustrated on the display 1106, book 1102 may be outlined with outline 1104 in order to highlight the position of the item to be picked. Additionally, or as an alternative example, icon 1110 may point to the item to be picked. Other forms of highlighting will be recognized by one of skill in the art and are contemplated and may be applied without departing from the scope of the invention disclosed herein.

Figure 12A:
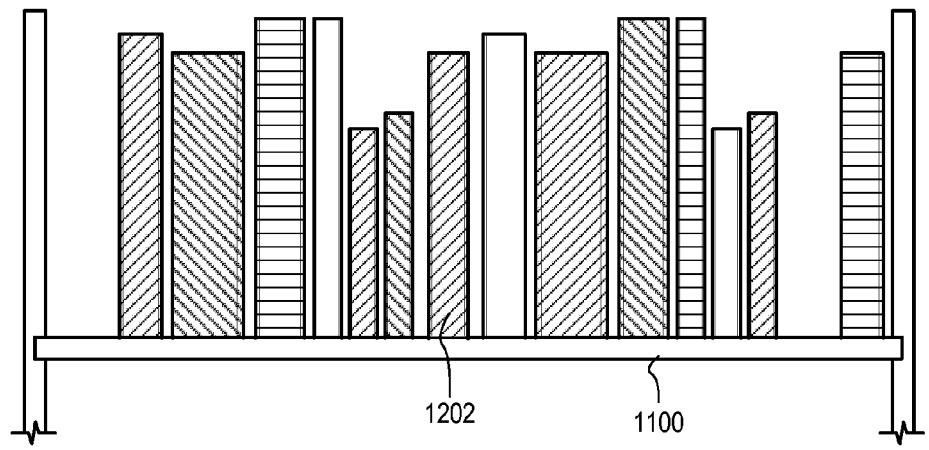
FIGS. 12A-12C illustrate inventory in an inventory location, according to some embodiments.
Figure 12B:
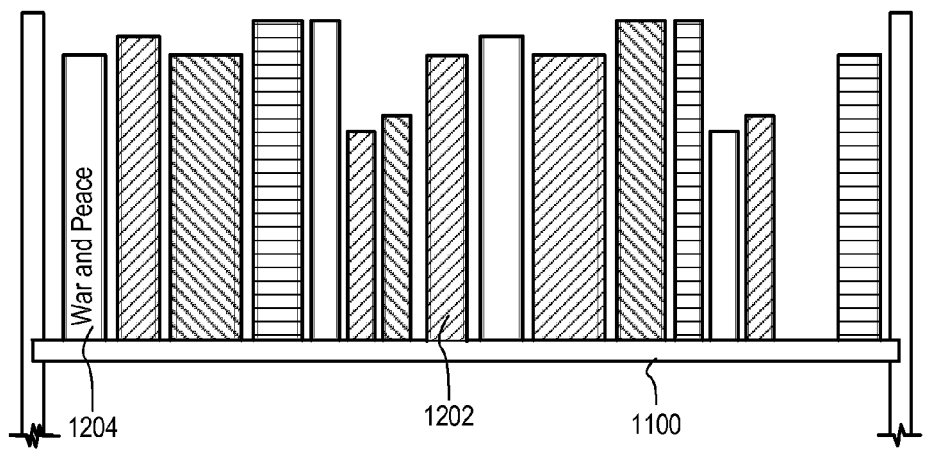
Figure 12C:
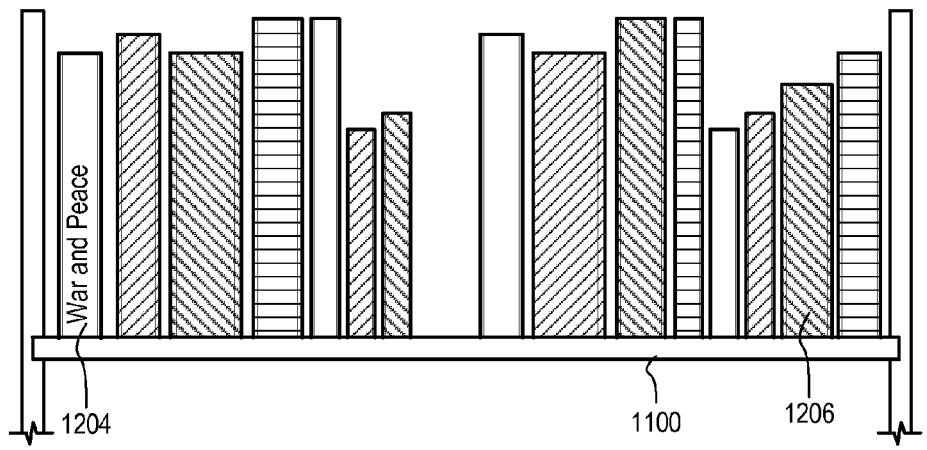

In one embodiment, FIGS. 12A-12C illustrate before and after images of inventory area 1100. For example, FIG. 12A illustrates inventory area 1100 with at least two open spaces for additional books. FIG. 12B illustrates inventory area 1100 with the book War and Peace 1204 stowed to one of the positions, for example, after the image of 12A was captured. FIG. 12C illustrates inventory area 1100 with book 1202 picked and book 1206 stowed subsequent to when the image of 12B was captured.

It will be readily apparent to one of skill in the art that when more than one item is altered in-between images, the difficulty of determining a position of a particular item from a diff of the two images may become more difficult. For example, because a diff of 12B and 12C will produce two different positions where changes have occurred, it is difficult to know whether book 1202 has been picked or move to the position where book 1206 now resides. For reasons similar to this, an enterprise may develop various rules of conduct associated with picking and stowing. In some embodiments, the rules may be known as stow etiquette. For example, one rule of stow etiquette may be that books shall always be placed with the binder outward. Another exemplary rule of stow etiquette may be that books are always stowed on edge and never stacked on top of one another or laid flat. Another exemplary rule of stow etiquette may be that an image shall be captured (or an id may always be scanned, thus triggering an image capture) every time any single item is stowed or picked. In some embodiments, etiquette may dictate that items are never to be moved in an inventory location, only stowed or picked. In some embodiments, a rule of etiquette may restrict a bin to items of only a certain number of product identifiers (e.g., Universal Product Code (UPC), Stock-Keeping Unit (SKU) code, or other designation (including proprietary designations) per bin. For example, a bin may be restricted to items belonging to any one of a set of four product identifiers. Similar rules for picking may be created. For example, if two similar items are store next to one another, the one on the left is always picked first.

In some embodiments, pick and stow rules of etiquette may be stored as logic, for example in data store 302 or elsewhere, for example as programming logic within item image component 200 or control system 100. The pick and stow rules may be applied in various embodiments disclosed and illustrated herein (e.g., FIGS. 5A-B, 6 and 13). In some embodiments, image difference determiner 308 and/or item image finder 312 may be configured to enforce the etiquette rules through programming logic included therein. For example, image difference determiner 308 may determine that, as illustrated in FIGS. 12B and 12C, more than one location in an image has a difference. Image difference determiner 308 may be configured to apply one of the etiquette rules, for example, that only one item shall be stowed or picked in between captured images and respond to a breach of that rule. For example, image difference determiner 308 may notify control system 100 about the breach of etiquette by sending an instruction to control system 100 that notifies the control system of the breach.

In some embodiments, the message may include identifying information about the item associated with the image capture, about the agent performing the stow or pick at the time of the image capture and the locations of the images as evidence of the breach of etiquette, all of which may have been stored by image difference determiner 308 to a data store such as data store 302, for example. In other embodiments, an etiquette breach file or group of data may be created by image difference determiner when the breach is detected. Again, the etiquette breach file or group of data may include identifying information about the item associated with the image capture, about the agent performing the stow or pick at the time of the image capture and the locations of the images as evidence of the breach of etiquette.

In various embodiments, analysis of etiquette pertaining to a pick or a stow may be performed in real-time or almost real-time with the pick or stow. In other embodiments, various messages may be sent to other parts of the system or feedback may be provided to the agent picking or stowing in real-time or almost real-time with the pick or stow.

FIG. 13 illustrates a method of image-based inventory determination and discrepancy resolution in accordance with various embodiments. Various image-based functionality described throughout the disclosure may be applied to existing processes within a materials handling facility to improve profitability and efficiency of the materials handling facility while reducing the cognitive load on agents of the materials handling facility. One example is the application of image-based inventory analysis to inventory verification as illustrated in FIG. 13.

As illustrated at 1310, a recent image of a storage bin with a plurality of units of items may be obtained. For example, while before and after images of any particular item of the storage bin may be old and as such, the contextual information carried within those images may not be as current as images associated with other items that have been stowed or picked to that inventory area. Thus, by selecting the most recent image associated with the inventory location (e.g., storage bin) irrespective of the particular item, the most recent contextual information may be used to determine the more recent status of other items in the inventory location. At 1320, an identifying image of the items may be compared to a recent image of the storage bin to determine an image-based inventory of the storage bin. In some embodiments, a record of the inventory of the storage bin may be recorded, either from past physical inspections or from other sources and stored, for example in data store 302. Item image finder 312 may use the records from data store 302 to determine and create a list of expected items for the storage bin, or may obtain the list from a data store such as data store 302. Item image finder may compare one or more identifying images of items from the list of expected items to a recent image of the storage bin to determine an image-based inventory of the storage bin. The analysis may result in identifying a missing item that was expected, but not found or finding an additional item that was not expected.

At 1330, the image-based inventory of the storage bin may be compared to the recorded inventory of the storage bin. For example, item image finder 312 may perform the comparison to determine if the recorded inventory matches the inventory captured in the recent image of the storage bin. If, as illustrated at 1340, an inventory discrepancy is not found, the process may return to obtain a recent image of a storage bin with a plurality of units of items, for example, as images of inventory locations are captured after inventory stows and picks as described herein. If, as also illustrated at 1340, an inventory discrepancy is found, an additional inventory verification of the particular storage bin may be triggered, as indicated at 1350. In some embodiments, an additional inventory verification of the particular storage bin may include an agent manually inspecting the image of the storage bin or an agent making a physical visit to the storage bin. At 1360, if the inventory discrepancy is not verified, the process may return to obtain a recent image of a storage bin at 1310, for example, if the manual inspection determines that there was not in inventory discrepancy. Also illustrated at 1360, if the inventory discrepancy is verified, the actual inventory record of the storage bin may be updated based on the inventory verification. In some embodiments, the actual inventory record of the storage bin or of the inventory location may be updated based upon the image-based inventory determination without verification.

In one embodiment, only position information may be initially provided for display by the image-based display system and the picking agent may request additional information through a button or other user interface control of a communication device. In response, the control system may provide descriptive information to be presented by the image-based display system. In another embodiment, the control system may initially provide no descriptive or position information to the image-based display system and may provide this information only after the picking agent requests the information. For example, the initial picking instructions may only include text representing a title or label on the given item and if the agent is not able to quickly locate the correct item, he or she may request position information, descriptive information, an image of the item, or some combination thereof. In another embodiment, the control system may be configured to provide only an item's title and/or descriptive information to the image-based display system initially, but may then provide position information for presentation if a picking agent requests additional information or if the picking agent is taking a longer time than usual (or longer than a configurable time) to locate the item. In yet another embodiment, the control system may be configured to provide additional information to be presented by the image-based display system if the picking agent scans (e.g., using a scan-code reader) an incorrect item. In some embodiments, the amount or fidelity of the presented information may vary based upon the availability of network resources, such as network bandwidth, control system 100, and/or a product database of data store 302.

Many of the operations illustrated by the flowcharts in FIGS. 6, 9, 10A-B and 13 may be suitable for automation, according to various embodiments. The amount of automation may vary from embodiment to embodiment. For example, in one embodiment, the entire receiving and stowing process may be completely automated using various conveying and scanning means to move the item within the facility and associate position and/or descriptive information with the item. In one such embodiment, software executing on a control system, such as control system 100, may be configured to automatically capture item images and associate the item images with the item based upon an automated identification of the item, such as through the automated scanning of a bar-code, and may store the item image in a product database, such as data store 302. The software may also be configured to automatically determine one or more inventory areas in which to store the item such that the item may be easily distinguishable based on characteristics of the item image, and the characteristics of other co-located items with item images, and may store an identifier of the inventory area in data store 302. In some embodiments, the software may also be configured to determine the item's position within the inventory area, based on positional placement guidelines followed by automated stowing means or by automatically capturing the position of the item using automated means such as the techniques described herein, for example. The software may then associate a position indicator with the item. In one embodiment, dimension information may be automatically determined and/or estimated for each item by the control system and/or the item image component 200 and may be associated with the item in the product database or datastore 302.

In embodiments in which various steps of a stowing operation are automated, agents may still use an image-based display system in a manual or semi-automated picking operation. For example, in one embodiment, pick lists may be automatically generated by control system 100. Similarly, control system 100 may be configured to automatically determine the location of one or more agents within the facility, a targeted inventory area for a picking operation, a path from the current location of the picking agent to the targeted inventory area, and position and/or descriptive information associated with an item such as an item image or inventory location image to be displayed by an image-based display device. Control system 100 may then generate and send messages to an image-based display system to direct an agent in the picking operation, as described herein. Control system 100 may also be configured to automatically track the location of the picking agent and the progress of the picking operation, using scanners, cameras, or other communication devices configured to automatically detect identifiers of agents, items, and/or other components in the facility.

Although many of the examples described herein involve the use of an image-based display system in picking and/or stowing operations of a materials handling facility, an image-based display system may also be used in other operations within the facility. For example, in a sorting or packing operation, the control system may be configured to send data to an image-based display device to display an image of an inventory location or other information to identify a bin, tote, shelf, or station to which one or more items should be transferred, a recommended container for a group of items, a hopper into which one or more items should be placed, a conveyor belt on which one or more items should be placed, or a slot through which one or more items should be passed. In another example, in a shipping operation, the control system may be configured to send data to an image-based display device to initiate display of an image or other information to identify a shipping lane (e.g., one associated with a particular carrier, truck, or set of zip codes associated with a shipment), or to identify a pallet or container to which items or item packages should be transferred for shipping. In yet another example, in a receiving operation, the control system may be configured to send data to an image-based display device to display an image or other information to identify the next box to process (e.g., by displaying a carton to be opened), based on information captured by a camera, scanner, or other sensing device. Other similar uses of an image-based display system in a materials handling facility are contemplated. The displayed images of various areas of the materials handling facility that are not inventory areas may have been captured prior to display and may have been captured as part of regular operations of the facility, such as when a pallet is moved for example, or may be have been captured as a particular image capture process specifically for this purpose.

Figure 14:
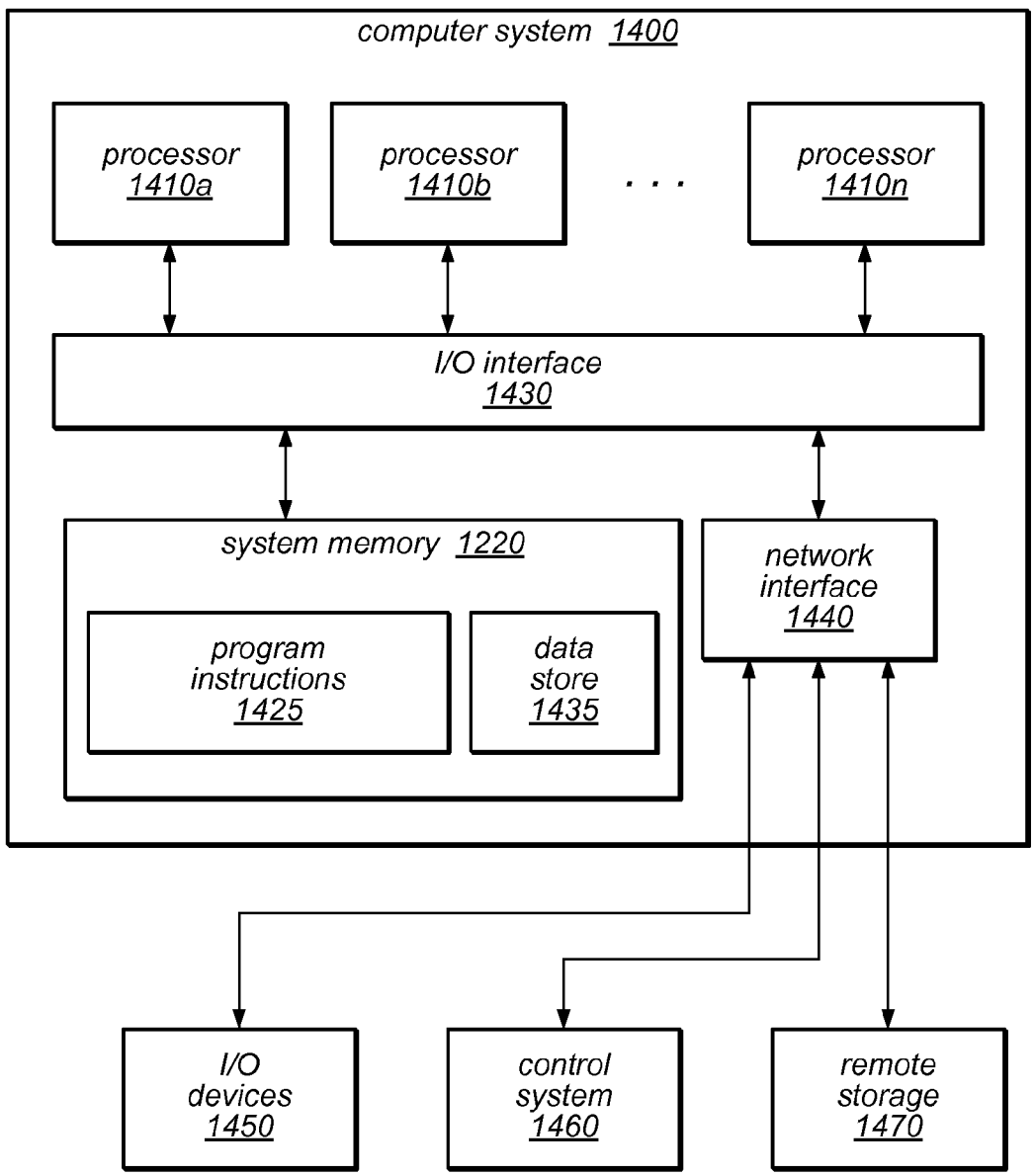
FIG. 14 is a block diagram illustrating a computer system suitable for use in a materials handling facility that employs an image-based display, according to one embodiment.

Any of various computer systems may be configured to implement the use of an image-based display system within a materials handling facility. For example, FIG. 14 is a block diagram illustrating one embodiment of a computer system suitable for implementing the system and methods described herein. In various embodiments, an order fulfillment control system (e.g., control system 100 of FIGS. 1, 5A and 5B), an image-based display system (e.g., image-based capture/display device 105 of FIGS. 5A,5B and 11), or a communication device (e.g., scanner 816 illustrated in FIG. 8), may each include a general-purpose computer system such as computer system 1400 illustrated in FIG. 14.

In the illustrated embodiment, computer system 1400 includes one or more processors 1410 coupled to a system memory 1420 via an input/output (I/O) interface 1430. Computer system 1400 further includes a network interface 1440 coupled to I/O interface 1430. In some embodiments, computer system 1400 may be illustrative of control system 100, while in other embodiments control system 100 may include more, fewer, or different elements than computer system 1400. In some embodiments, computer system 1400 may be illustrative of an image-based display system, an image-based display device (e.g., 105, 755, 810, 816), or a communication device (e.g., 105, 750, 810) while in other embodiments an image-based display system, image-based display device, or communication device may include more, fewer, or different elements than computer system 1400.

In various embodiments, computer system 1400 may be a uniprocessor system including one processor 1410, or a multiprocessor system including several processors 1410 (e.g., two, four, eight, or another suitable number). Processors 1410 may be any suitable processors capable of executing instructions. For example, in various embodiments, processors 1410 may be general-purpose or embedded processors implementing any of a variety of instruction set architectures (ISAs), such as the x86, PowerPC, SPARC, or MIPS ISAs, or any other suitable ISA. In multiprocessor systems, each of processors 1410 may commonly, but not necessarily, implement the same ISA.

System memory 1420 may be configured to store instructions and data accessible by processor 1410. In various embodiments, system memory 1420 may be implemented using any suitable memory technology, such as static random access memory (SRAM), synchronous dynamic RAM (SDRAM), non-volatile/Flash-type memory, or any other type of memory. In the illustrated embodiment, program instructions and data implementing desired functions, such as those methods and techniques described above for an order fulfillment control system, an image-based display system, or a communication device, are shown stored within system memory 1420 as program instructions 1425. In some embodiments, system memory 1420 may include product database 1435, which may be configured as described herein (e.g., data store 302). In other embodiments, remote storage 1470 may include a product database instead of, or in addition to, system memory 1420. For example, the information described herein as being stored in a product database may be partitioned between a database included in system memory 1420 and one or more databases included on one or more remote storage devices 1470, in various embodiments.

In one embodiment, I/O interface 1430 may be configured to coordinate I/O traffic between processor 1410, system memory 1420 and any peripheral devices in the system, including through network interface 1440 or other peripheral interfaces. In some embodiments, I/O interface 1430 may perform any necessary protocol, timing or other data transformations to convert data signals from one component (e.g., system memory 1420) into a format suitable for use by another component (e.g., processor 1410). In some embodiments, I/O interface 1430 may include support for devices attached through various types of peripheral buses, such as a variant of the Peripheral Component Interconnect (PCI) bus standard or the Universal Serial Bus (USB) standard, for example. In some embodiments, the function of I/O interface 1430 may be split into two or more separate components, such as a north bridge and a south bridge, for example. Also, in some embodiments, some or all of the functionality of I/O interface 1430, such as an interface to system memory 1420, may be incorporated directly into processor 1410.

Network interface 1440 may be configured to allow data to be exchanged between computer system 1400 and other devices attached to a network, such as other computer systems, for example. In particular, network interface 1440 may be configured to allow communication between computer system 1400 and various I/O devices 1450, control system 1460, and/or remote storage 1470. I/O devices 1450 may include laser-based display devices making up an image-based display system and/or other communication devices, as described herein. Network interface 1440 may commonly support one or more wireless networking protocols (e.g., Wi-Fi/IEEE 802.11, or another wireless networking standard). However, in various embodiments, network interface 1440 may support communication via any suitable wired or wireless general data networks, such as other types of Ethernet networks, for example. Additionally, network interface 1440 may support communication via telecommunications/telephony networks such as analog voice networks or digital fiber communications networks, via storage area networks such as Fibre Channel SANs, or via any other suitable type of network and/or protocol.

In some embodiments, system memory 1420 may be one embodiment of a computer-accessible medium configured to store program instructions and data as described above. However, in other embodiments, program instructions and/or data may be received, sent or stored upon different types of computer-accessible media. Generally speaking, a computer-accessible medium may include computer-readable storage media or memory media such as magnetic or optical media, e.g., disk or DVD/CD-ROM coupled to computer system 1400 via I/O interface 1430. A computer-readable storage medium may also include any volatile or non-volatile media such as RAM (e.g. SDRAM, DDR SDRAM, RDRAM, SRAM, etc.), ROM, etc, that may be included in some embodiments of computer system 1400 as system memory 1420 or another type of memory. Further, a computer-accessible medium may include transmission media or signals such as electrical, electromagnetic, or digital signals, conveyed via a communication medium such as a network and/or a wireless link, such as may be implemented via network interface 1440.

In one embodiment, the relationship between control system 1460 and I/O devices 1450 may be a server/client type of relationship. For example, control system 1460 may be configured as a server computer system 1400 that may convey instructions to and receive acknowledgements from I/O devices 1450. In such an embodiment, I/O devices 1450 may be relatively simple or "thin" client devices. For example, I/O devices 1450 may be configured as dumb terminals with display, data entry and communications capabilities, but otherwise little computational functionality. However, in some embodiments, I/O devices 1450 may be computer systems configured similarly to computer system 1400, including one or more processors 1410 and various other devices (though in some embodiments, a computer system 1400 implementing an I/O device 1450 may have somewhat different devices, or different classes of devices, compared to a computer system 1400 implementing control system 100). It is further contemplated that in some embodiments, the functionality of control system 100 may be distributed across some or all of I/O devices 1450. That is, in some embodiments, there may be no centralized point of control of the activity of order fulfillment center agents; rather, I/O devices 1450 may function in a cooperative, distributed fashion to coordinate the activities of the order fulfillment facility.

In various embodiments, I/O devices 1450 (e.g., laser-baser display devices and other communication devices) may include, but are not limited to, one or more of: handheld devices, devices worn by or attached to the agents, and devices integrated into or mounted on any mobile or fixed equipment of the order fulfillment facility such as pushcarts, bins, totes, racks, shelves, tables, ceilings, walls, and work benches, according to various embodiments. I/O devices 1450 may further include, but are not limited to, one or more of: personal computer systems, desktop computers, rack-mounted computers, laptop or notebook computers, workstations, network computers, "dumb" terminals (i.e., computer terminals with little or no integrated processing ability), Personal Digital Assistants (PDAs), mobile phones, or other handheld devices, proprietary devices, printers, or any other devices suitable to communicate with control system 1460. In general, an I/O device 1450 may be any device that can communicate with control system 1460 and convey instructions to agents within the facility. In one embodiment, at least some of the I/O devices 1450 may be configured to scan or otherwise read or receive codes or identifiers of various components in the order fulfillment facility and to communicate the entered codes to control system 1460 for use in directing agents in the various operations of the control center (e.g., bar code scanners, RFID readers, cameras, or any other sensing devices). Such components may include, but are not limited to, one or more of items, orders, modular sorting stations, modular bins, and compartments of modular bins.

In one embodiment, as least some of the I/O devices 1450 may be configured as laser-based display devices and/or light-based display devices, having the functionality described herein. More specifically, laser-based display devices, as described herein, may include devices employing vector-based laser technology (e.g., those having one horizontal and one vertical oscillating mirror), or raster-based laser technology (including MEMS technology and/or other techniques that include one mirror for each color), or any other suitable laser technology. In some embodiments, an image-based display system may include one or more fixed-location, portable, or embedded projection display devices, or one or more wearable projection display devices, that utilize laser-based and/or light-based projection technology.

The various methods as illustrated in the figures and described herein represent exemplary embodiments of methods. The methods may be implemented manually, in software, in hardware, or in a combination thereof. The order of any method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
one or more computing devices configured to implement:
a control module configured to direct a stowing or picking process of a unit of an item to or from, respectively, a storage bin in a materials handling facility, wherein the unit of the item is stowed among or picked from among one or more units of one or more other items in the storage bin; and
an item image module configured to:
receive a before image of the storage bin before the unit of the item is stowed to or picked from the storage bin;
receive an after image of the storage bin after the unit of the item is stowed to or picked from the storage bin; and
determine an image of the item based on a comparison of the before and after images of the storage bin, wherein the determined image of the item distinguishes the item from the one or more other items in the storage bin.

2. The system of claim 1, further comprising receiving an image of another storage bin and using the determined image of the item based on the comparison to determine a position of another unit of the item in the another storage bin.

3. The system of claim 2, wherein subsequent to the determination of the position of the other unit of the item in the other storage bin, the control module is further configured to send a recent image of the other storage bin to a device for display on the device, wherein the position of the item is highlighted in the displayed recent image to facilitate picking of the other unit of the item from the other storage bin.

4. A method, comprising:
performing by one or more computing devices having one or more processors:
directing one or more agents to stow an item to or pick an item from a storage location of a materials handling facility, wherein a given unit of the item is stowed among or picked from among one or more units of other items in the storage location;
receiving a before image of the storage location before the unit of the item is stowed to or picked from the storage location;
receiving an after image of the storage location after the unit of the item is stowed to or picked from the storage location; and
determining an image of the item based on a comparison of the before and after images, wherein the determined image of the item distinguishes the item from the other items in the storage location.

5. The method of claim 4, further comprising scanning an identifier (ID) of the storage location, wherein scanning the ID of the storage location triggers capturing the before image or the after image.

6. The method of claim 4, further comprising:
repeating the steps of directing, receiving a before image, receiving an after image and determining, for a plurality of units of the item at a plurality of other storage locations such that a plurality of images of the item are determined; and
applying one or more analysis techniques to the plurality of images to select one or more identifying images of the item from the plurality of images of the item.

7. The method of claim 6, further comprising:
obtaining a recent image of another storage location of another unit of the item;
comparing one or more identifying images of the item to the recent image of the another storage location to determine an image-based inventory of units of the item for the another storage location;
determining a discrepancy between the determined image-based inventory and an inventory record associated with the another storage location; and
based at least in part on a determination of a discrepancy, triggering an inventory check on the another storage location.

8. The method of claim 7, wherein the inventory check comprises recording the discrepancy in a discrepancy record, sending an instruction for a manual inspection of the image of the another storage location, or sending an instruction for a manual inspection of the another storage location.

9. The method of claim 4, further comprising:
identifying another unit of the item for picking in another storage location;
obtaining a recent image of the another storage location;
determining a position of the another unit of the item in the another storage location; and
displaying the recent image of the another storage location, wherein the position of the another unit of the item in the image of the another storage location is highlighted.

10. The method of claim 4, further comprising:
analyzing at least the after image of the item in the storage location; and
observing, in the after image, a breach of stow etiquette, wherein the breach in stow etiquette comprises failure to comply with a stow etiquette rule stored in a stow etiquette data store.

11. The method of claim 4, wherein the storage location comprises one or more graphic indicators that are captured in the before image or the after image, wherein one or more known physical dimensions are associated with the one or more graphic indicators, the method further comprising:
determining a ratio between the one or more known physical dimensions and one or more dimensions represented in the before or after image based on the one or more graphic indicators captured in the image; and
using the ratio to determine one or more physical dimensions of the unit of the item represented in the image of the storage location.

12. The method of claim 4, further comprising:
receiving an image of another storage location;
determining a dimension scale for items represented in the image of another storage location based upon known dimensions for one or more graphical indicators represented in the image or based upon known dimension data of one or more items represented in the image; and identifying another unit of the item based at least in part on using the dimension scale for items represented in the image and at least one known dimension of the item.

13. A non-transitory computer-readable medium, storing program instructions that when executed by a computer perform:

directing one or more agents to stow an item to or pick the item from a storage location of a materials handling facility, wherein a given unit of the item is stowed among or picked from among one or more units of other items in the storage location;

receiving a before image of the storage location before the unit of the item is stowed to or picked from the storage location;

receiving an after image of the storage location after the unit of the item is stowed to or picked from the storage location; and determining an image of the unit of the item based on a comparison of the before and after images, wherein the determined image of the item distinguishes the item from the other items in the storage location.

14. The non-transitory computer-readable medium of claim 13, wherein the program instructions are further executable to perform:

repeating the directing, receiving the before image, receiving the after image and determining to determine a plurality of images of an item; and selecting one or more identifying images of the item from the plurality of determined images wherein the selecting comprises applying machine learning techniques to the plurality of images to select the one or more identifying images of the item.

15. The non-transitory computer-readable medium of claim 14, wherein the program instructions are further executable to perform:

obtaining an image of another storage location of another unit of the item;

comparing one or more identifying images of the item to the image of the another storage location to determine an inventory of units of the item for the another storage location;

determining a discrepancy between the determined inventory and an inventory record associated with units of the item for the another storage location; and based at least in part on a determination of a discrepancy, triggering an inventory check on the another storage location.

16. The non-transitory computer-readable medium of claim 15, wherein the inventory check comprises recording the discrepancy in a discrepancy record, sending an instruction for a virtual inspection of the another storage location, or sending an instruction for a physical inspection of the another storage location.

17. The non-transitory computer-readable medium of claim 13, wherein the storage location comprises one or more graphical indicators of a known dimension that are captured during said capturing the before image or the after image, and wherein the program instructions are further executable to perform:

determining a ratio between the known dimension and a dimension represented in the before image or the after image based on the one or more graphic indicators represented in the image; and using the ratio to determine one or more dimensions of the unit of the item represented in the image of the storage location.

18. The non-transitory computer-readable medium of claim 13, wherein the program instructions are further executable to perform:

identifying another unit of the item for picking;

obtaining an image of another storage location of the another unit of the item; and displaying the image of the another storage location of the another unit of the item, wherein the another unit of the item in the image of the another storage location is highlighted.

19. The non-transitory computer-readable medium of claim 13, wherein the program instructions are further executable to perform:

obtaining an image of another storage location subsequent to a picking of a unit of the item from, or a stow of the item to the another storage location;

determining a prior position of the picked or a current position of the stowed item in the storage location; and analyzing the determined prior or current position of the item in the storage location to determine a breach of stow etiquette, wherein the breach in stow etiquette comprises failure to comply with a stow etiquette rule stored in a stow etiquette data store.

20. The non-transitory computer-readable medium of claim 13, wherein the program instructions are further executable to perform:

analyzing a positional relationship between a plurality of graphical indicators represented in the before image or in the after image to determine a perspective distortion of the before image or the after image of the storage location;

performing an alignment process, wherein the alignment process includes perspective correction to produce a corrected image of the storage location; and identifying the item in the corrected image of the storage location.

* * * * *